United States Patent [19]
Izumi et al.

[11] Patent Number: 5,648,905
[45] Date of Patent: Jul. 15, 1997

[54] TRAVELING CONTROL SYSTEM FOR MOTOR VEHICLE

[75] Inventors: Tomoji Izumi, Hatsukaichi; Kenji Shimizu, Higashi-Hiroshima; Yoshiaki Sugamoto, Hatsukaichi; Kazuyoshi Okuda, Hiroshima-Ken; Satoru Ando, Higashi-Hiroshima; Toshihiro Ishihara, Hiroshima-Ken; Takahiro Inada, Higashi-Hiroshima; Tsunehisa Okuda, Hiroshima, all of Japan

[73] Assignee: Mazda Motor Corporation, Hiroshima, Japan

[21] Appl. No.: 353,207

[22] Filed: Dec. 1, 1994

[30] Foreign Application Priority Data

Dec. 7, 1993 [JP] Japan .................... 5-306454

[51] Int. Cl.$^6$ .................................... G06G 7/78
[52] U.S. Cl. .................... 364/461; 364/426.041; 340/435; 340/903; 180/169
[58] Field of Search ............... 364/426.04, 460, 364/461; 180/167–169, 176–179; 342/454, 455, 70, 71; 340/901, 903, 904, 435, 436

[56] References Cited

U.S. PATENT DOCUMENTS

| 4,670,845 | 6/1987 | Etoh | 364/460 |
|---|---|---|---|
| 4,703,429 | 10/1987 | Sakata | 364/461 |
| 4,757,450 | 7/1988 | Etoh | 364/461 |
| 5,172,315 | 12/1992 | Asanuma et al. | 180/169 |
| 5,172,317 | 12/1992 | Asanuma et al. | 180/169 |
| 5,309,137 | 5/1994 | Kajiwara | 340/436 |
| 5,369,590 | 11/1994 | Karasudani | 364/460 |
| 5,388,048 | 2/1995 | Yavnayi | 364/426.04 |
| 5,467,283 | 11/1995 | Butsuen et al. | 364/461 |
| 5,467,284 | 11/1995 | Yoshioka et al. | 364/461 |
| 5,487,116 | 1/1996 | Nakano et al. | 364/460 |

FOREIGN PATENT DOCUMENTS 51-7892  3/1976  Japan .

Primary Examiner—Gary Chin
Attorney, Agent, or Firm—Keck, Mahin & Cate

[57] ABSTRACT

A traveling control system for a motor vehicle includes a detector for detecting an object which exists in front of the motor vehicle to follow a vehicle traveling ahead. The system further includes a first course determination device for estimating a first course on which the motor vehicle will travel hereafter, an identification device for identifying an first target vehicle among the objects existing on the first course, and a second course estimation device for estimating, based on the first target vehicle, a second course on which the motor vehicle will travel hereafter at least while the first target vehicle is outside of the first course. The identification device identifies a second target vehicle among vehicles which travel on the first or second courses while the first target vehicle is outside of the first course.

20 Claims, 21 Drawing Sheets

TRAVELING CONTROL SYSTEM FOR MOTOR VEHICLE

BACKGROUND OF THE INVENTION

1. Field of the Invention

The present invention relates to a traveling control system for a motor vehicle and, in particular, to a traveling vehicle which can follow another vehicle traveling ahead of the vehicle and avoid contact with the other vehicle.

2. Description of the Related Art

The conventional obstacle detection system used in such a traveling control system for a motor vehicle is disclosed in for example Japanese Patent Publication No. 51-7892. The conventional obstacle detection system includes a radar device which detects an obstacle such as a vehicle traveling ahead by transmitting radar waves such as an ultrasonic wave and an electric wave toward the front direction of the vehicle, a rotation device for rotating the radar device in a horizontal direction, and a steering sensor for detecting a steering angle of the vehicle. According to the steering angle detected by the steering sensor, the radar device is rotated through the predetermined horizontal angle by the rotation device and the radar wave is transmitted in the same direction as the direction in which the vehicle is traveling.

Recently a scanning-type radar device has been developed. The scanning-type radar device scans a wide scope in the horizontal direction and picks up only the information of the obstacle located on an traveling course on which the vehicle is supposed to travel thereafter. The traveling course is estimated by the driving conditions of the vehicle such as a steering angle and/or a vehicle speed.

The above-mentioned conventional obstacle detection system estimates the traveling course, based on the driving conditions of the vehicle, when the radar device detects another vehicle traveling ahead on the estimated traveling course. Therefore, there is a problem in the conventional obstacle detection system. Namely, when another vehicle traveling ahead goes into the curved road from the straight road and the vehicle equipped with the detection system is still traveling on the straight road, the other vehicle traveling ahead has left the estimated traveling course. As a result, the vehicle with the detection system can not detect in an early stage a vehicle which newly enters into the curved road and travels between the other vehicle ahead and the vehicle with the detection system.

SUMMARY OF THE INVENTION

It is therefore an object of the present invention to provide a traveling control system for a motor vehicle which can identify a vehicle traveling ahead with accuracy when the traveling course of the motor vehicle is difficult to estimate.

It is another object of the present invention to provide a traveling control system for a motor vehicle which can identify in an early stage a vehicle which enters between a target vehicle to be followed and the motor vehicle on a curved road by estimating first and second courses.

The above object is achieved according to the present invention by providing a traveling control system for a motor vehicle comprising means for detecting an object which exists in front of the motor vehicle, first course estimation means for estimating a first course on which the motor vehicle will travel hereafter, identification means for identifying an first target vehicle among the objects existing on the first course detected by the detecting means, and second course estimation means for estimating based on the first target vehicle a second course on which the motor vehicle will travel hereafter, at least while the first target vehicle is outside of the first course, the identification means identifying a second target vehicle among vehicles which travel on the first or second courses while the first target vehicle is outside of the first course.

In a preferred embodiment of the present invention, the first course estimation means estimates the first course based on driving conditions of the motor vehicle.

In another preferred embodiment of the present invention, the traveling control system further comprises means for determining the object existing in front of the vehicle as a stationary object, and the first course estimation means estimates the first course based on a property of the stationary object.

In still another preferred embodiment, the first course estimation means estimates the first course based on driving conditions of a vehicle traveling ahead of the motor vehicle.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, the preferred embodiments of the present invention will be explained with reference to the drawings.

Figure 1:
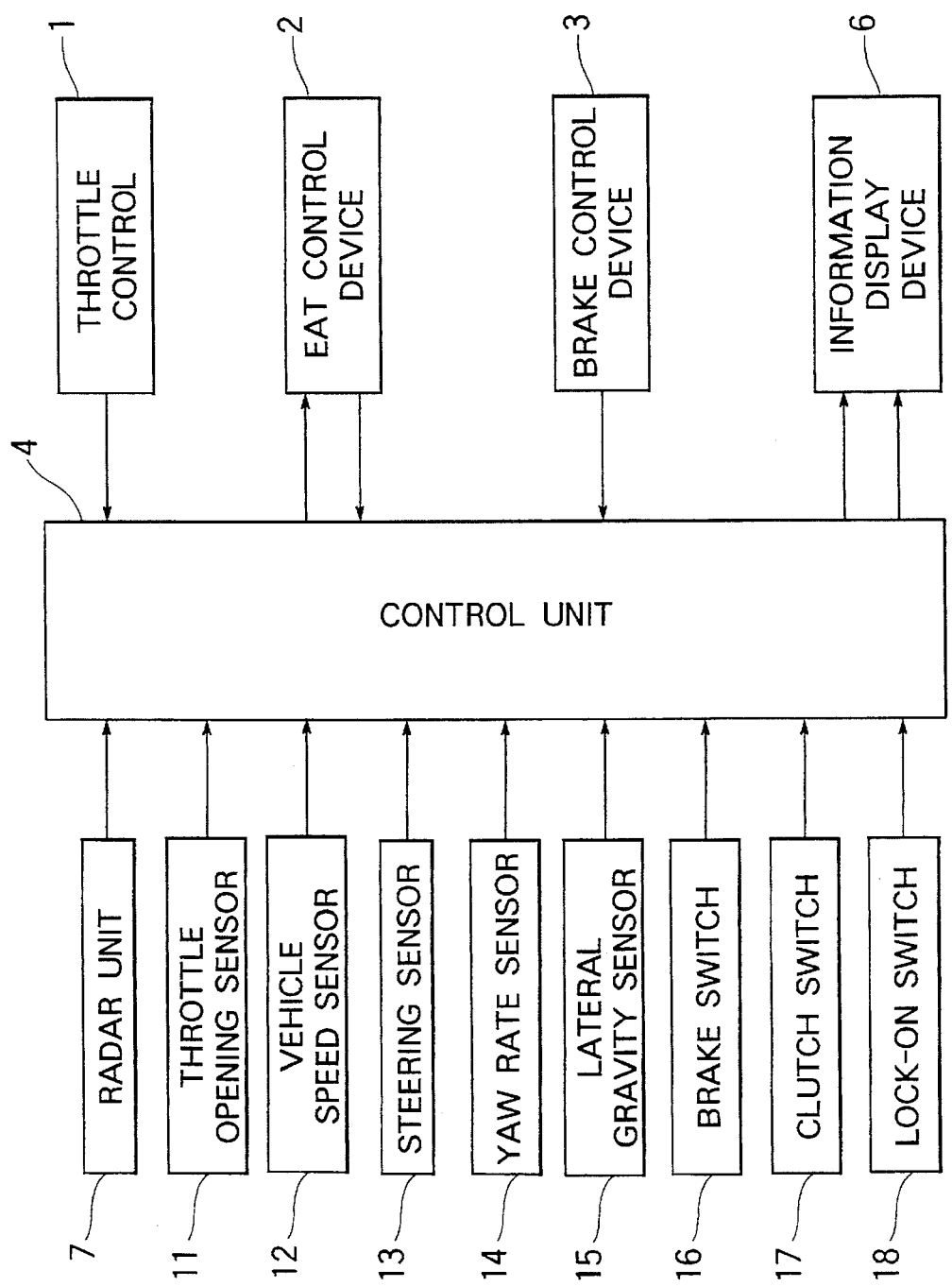
FIG. 1 is a block diagram showing a traveling control system for a motor vehicle in accordance with a first embodiment of the present invention.

A first embodiment of the present invention will be explained with reference to FIGS. 1 through 13. FIG. 1 is a block diagram showing a traveling control system for a motor vehicle in accordance with a first embodiment of the present invention.

Referring to FIG. 1, a traveling control system for a motor vehicle includes a throttle control device 1 for controlling automatically an opening of a throttle valve of an engine, a control device 2 for an electric control type automatic transmission (EAT), and a brake control device 3 for controlling automatically brake forces applied to respective wheels. These three control devices 1-3 respectively include actuators (not shown) which are controlled by a control unit 4.

The control unit 4 outputs a target throttle opening signal to the actuator of the throttle control device 1 and controls the actuator, and outputs a target brake force signal to the actuator of the brake control device 2 and controls the actuator. The control unit 4 further receives a shift position signal from a sensor (not shown) for detecting a shift position of the EAT control device 2 and outputs a shift control signal to the actuator of the EAT control device 2.

The traveling control system further includes an information display device 6 attached on an instrument panel in a compartment of the vehicle. The information display device 6 has an alarm lamp lighting by receiving an alarm signal from the control unit 4 and a display portion for displaying an image by receiving a self-diagnosis signal from the control unit 4. The traveling control system further includes a radar device 7 for detecting an object such as a vehicle traveling in front of the vehicle with the traveling control system. The radar device 7 transmits an extreme infrared radiation as a radar wave toward the front direction of the vehicle, receives a reflecting wave reflected on the vehicle traveling ahead, and estimates a distance between the vehicle and the vehicle ahead by using a time delay between a transmitting time and a receiving time of the radar wave. The signal of the detected distance between the vehicle and the vehicle ahead is input to the control unit 4. The radar device 7 is a scanning type which can scan the radar wave in a wide range in a horizontal direction.

The traveling control system further includes a throttle opening sensor 11 for detecting an opening of a throttle valve, a vehicle speed sensor 12 for detecting a vehicle speed, a steering angle sensor 13 for detecting a steering angle of a steering wheel, a yaw rate sensor 14 for detecting a yaw rate generated by the vehicle, a lateral gravity sensor 15 for detecting lateral gravity generated by the vehicle, a brake switch 16 which is switched to be on when a brake pedal is operated by a driver, a clutch switch 17 which is switched to be on according to clutch operation conditions, and a lock-on switch 18. Detection signals from the sensors and switches 11-18 are respectively input to control unit 4. Further, detection signals from an engine rotation sensor and the like (not shown) are input to the control unit 4.

Figure 2:
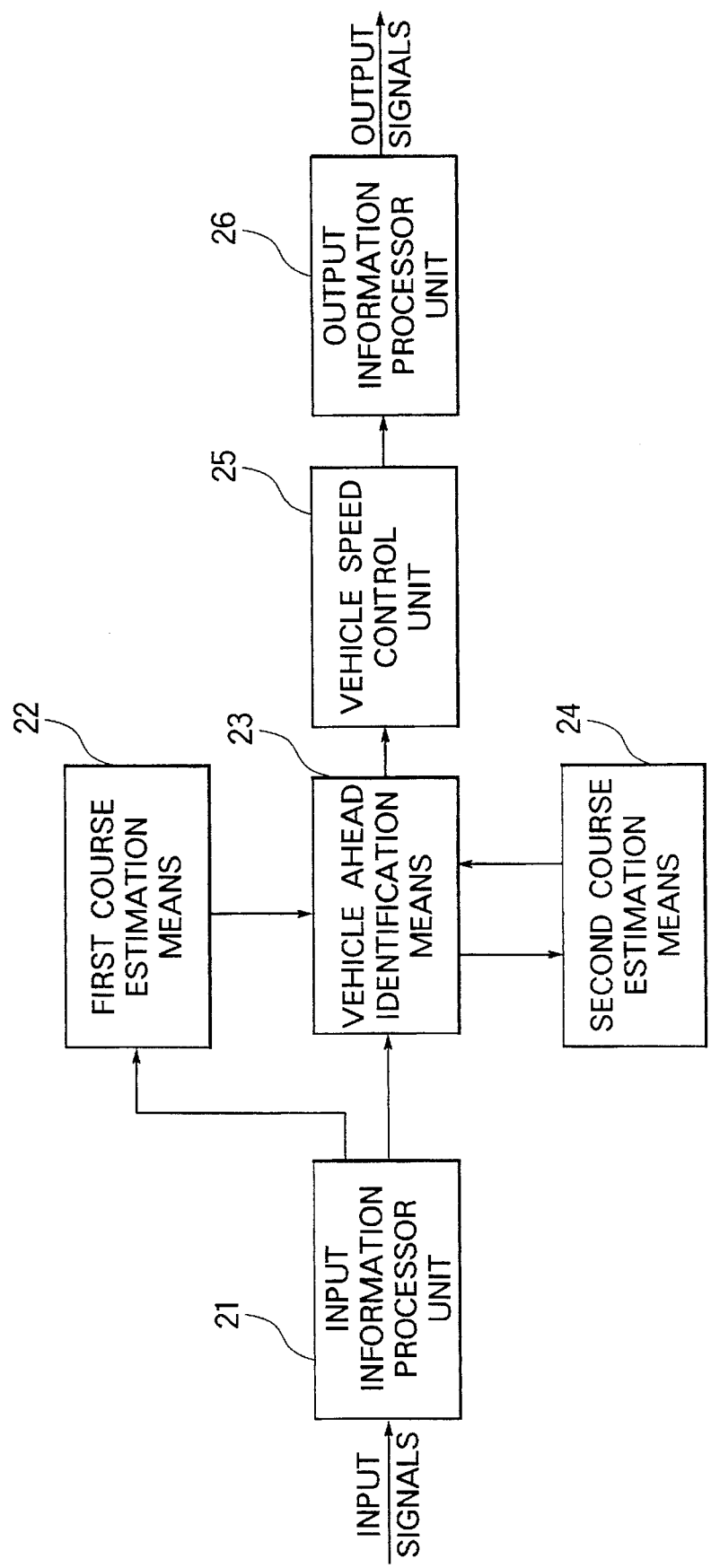
FIG. 2 is a block diagram showing a control unit of the traveling control system of the first embodiment of the present invention.

Referring to FIG. 2, the control unit 4 includes an input information processor unit 21 which receives the signals from the sensor and switches 11-18 and processes the signals, a first course estimation means 22 which receives information regarding traveling conditions such as the vehicle speed, the steering angle, the yaw rate and the like of the vehicle M (see FIG. 9) with the traveling control system and estimates, based on the information regarding the traveling conditions of the vehicle M, a first course K1 (see FIG. 10) on which the vehicle M is supposed to travel hereafter, and a vehicle ahead (target vehicle) identification means 23 which receives the information regarding the object detected by the radar device 7 from the input information processor unit 21 and receives the information regarding the first course K1 of the vehicle M from the first course estimation means 22. The vehicle ahead identification means 23 determines a vehicle A (see FIG. 9) which travels in front of the vehicle M and is closest to the vehicle M among the objects on the first course K1 detected by the radar unit 7.

The control unit 4 further includes a second course estimation means 24 which receives information such as the location regarding the vehicle A traveling ahead of the vehicle M and estimates, based on the information of the vehicle A traveling ahead, a second course K2 (see FIG. 10) on which the vehicle M is supposed to travel hereafter. The information regarding the second course estimated by the second course estimation means 24 is input to the vehicle ahead identification means 23. Then, the vehicle ahead identification means 23 identifies a vehicle which is closest to the vehicle M among the vehicles such as A, B and C traveling on the first and second courses, when the vehicle ahead leaves the first course or when the first course becomes different from the second course (see FIG. 10).

The information regarding the vehicle ahead which is closest to the vehicle M and is identified by the vehicle ahead identification means 23 is input to a vehicle speed control unit 25. The vehicle speed control unit 25 judges a possibility of a contact between the vehicle ahead and the vehicle M based on the distance and the relative speed between the two vehicles, and thereafter outputs the information to an output information processor unit 26 according to the result of judgment.

Figure 3:
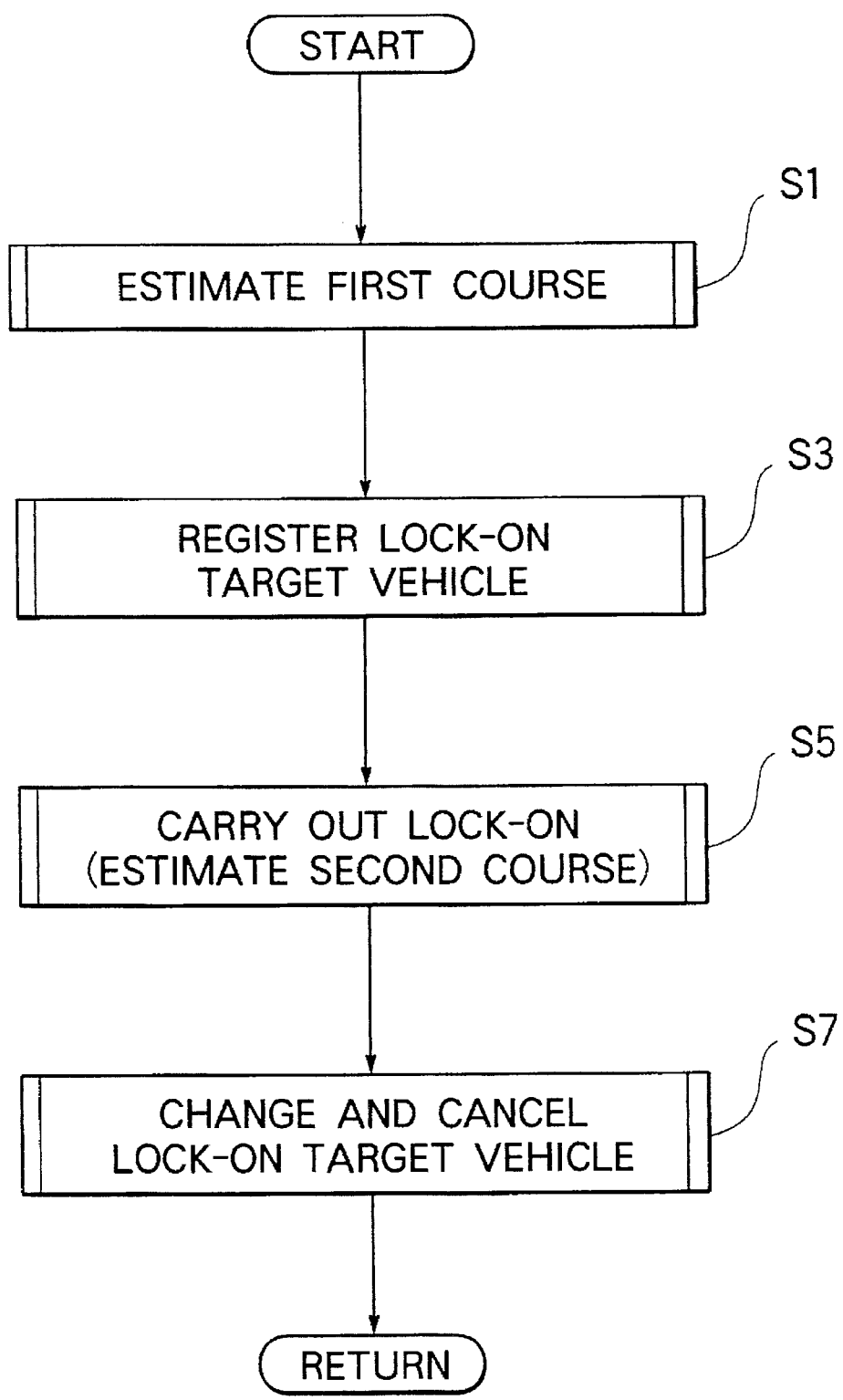
FIG. 3 is a flow chart showing a main routine when the motor vehicle is following up another vehicle traveling ahead in accordance with the first embodiment of the present invention.

FIG. 3 is a flow chart showing a main routine when a lock-on switch 18 is switched to be on so that a vehicle M is following up another vehicle traveling ahead.

Figure 5:
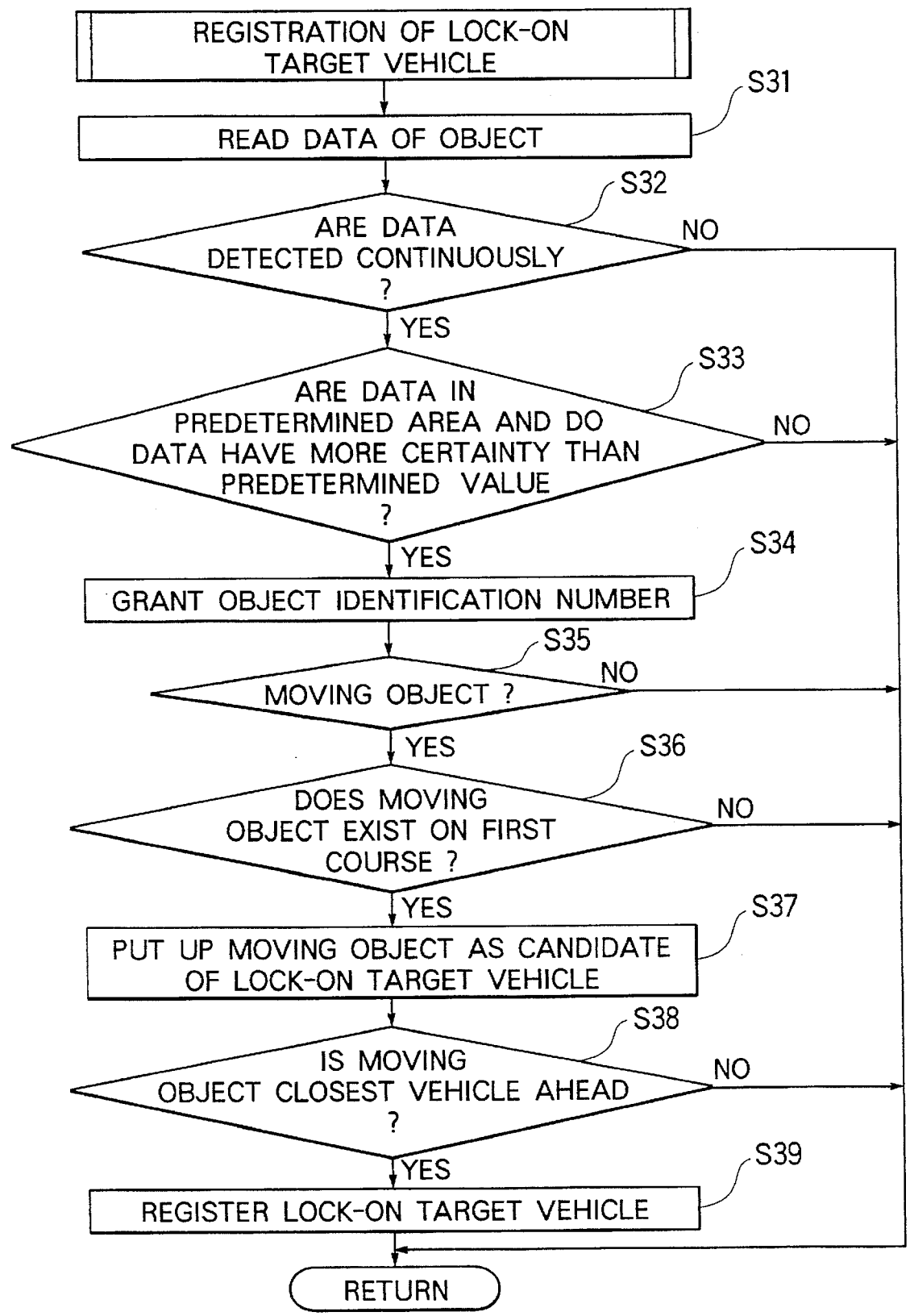
FIG. 5 is a flow chart showing a subroutine for a registration of a lock-on target vehicle in accordance with the first embodiment of the present invention.
Figure 6:
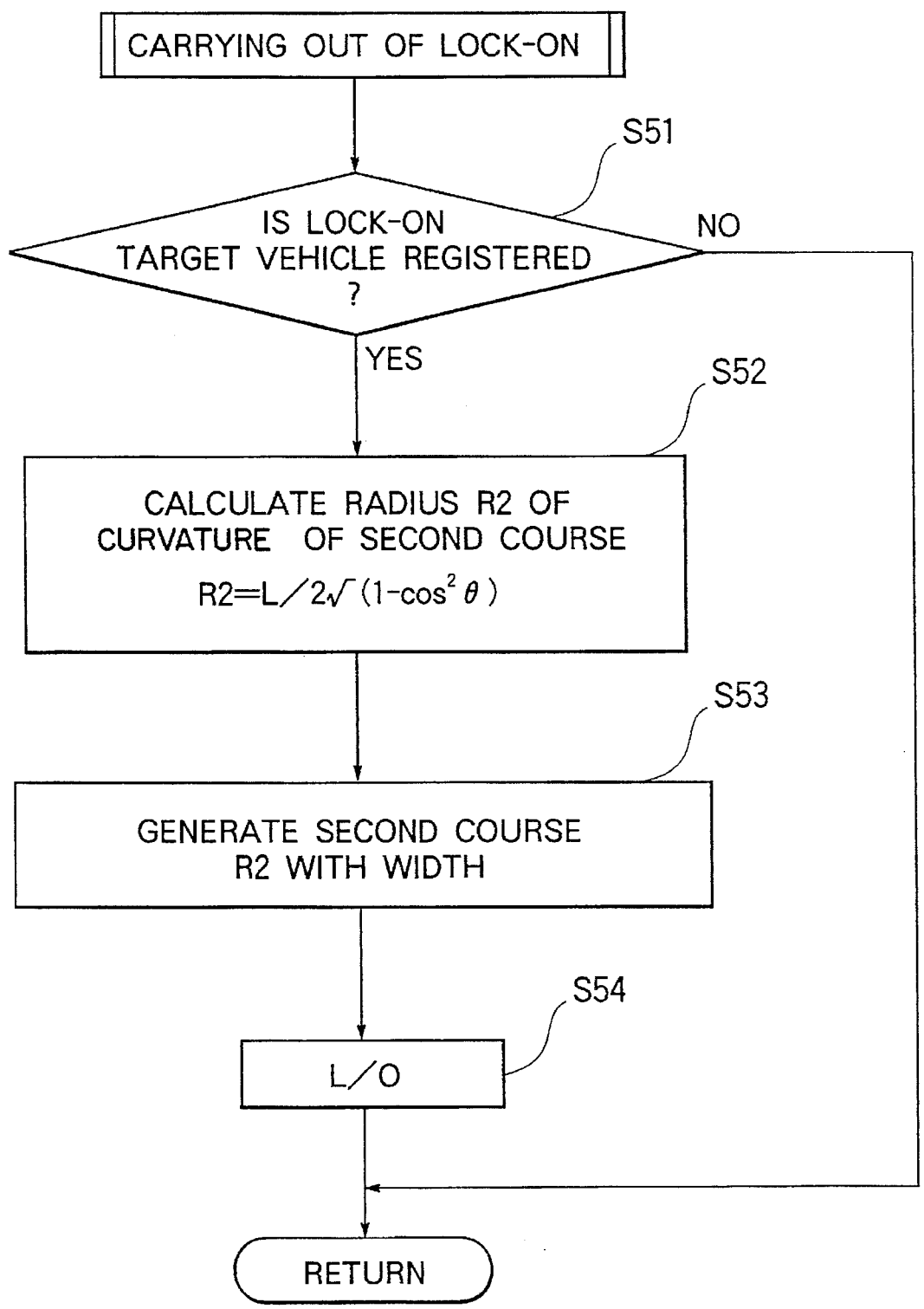
FIG. 6 is a flow chart showing a subroutine for carrying out lock-on in accordance with the first embodiment of the present invention.
Figure 7:
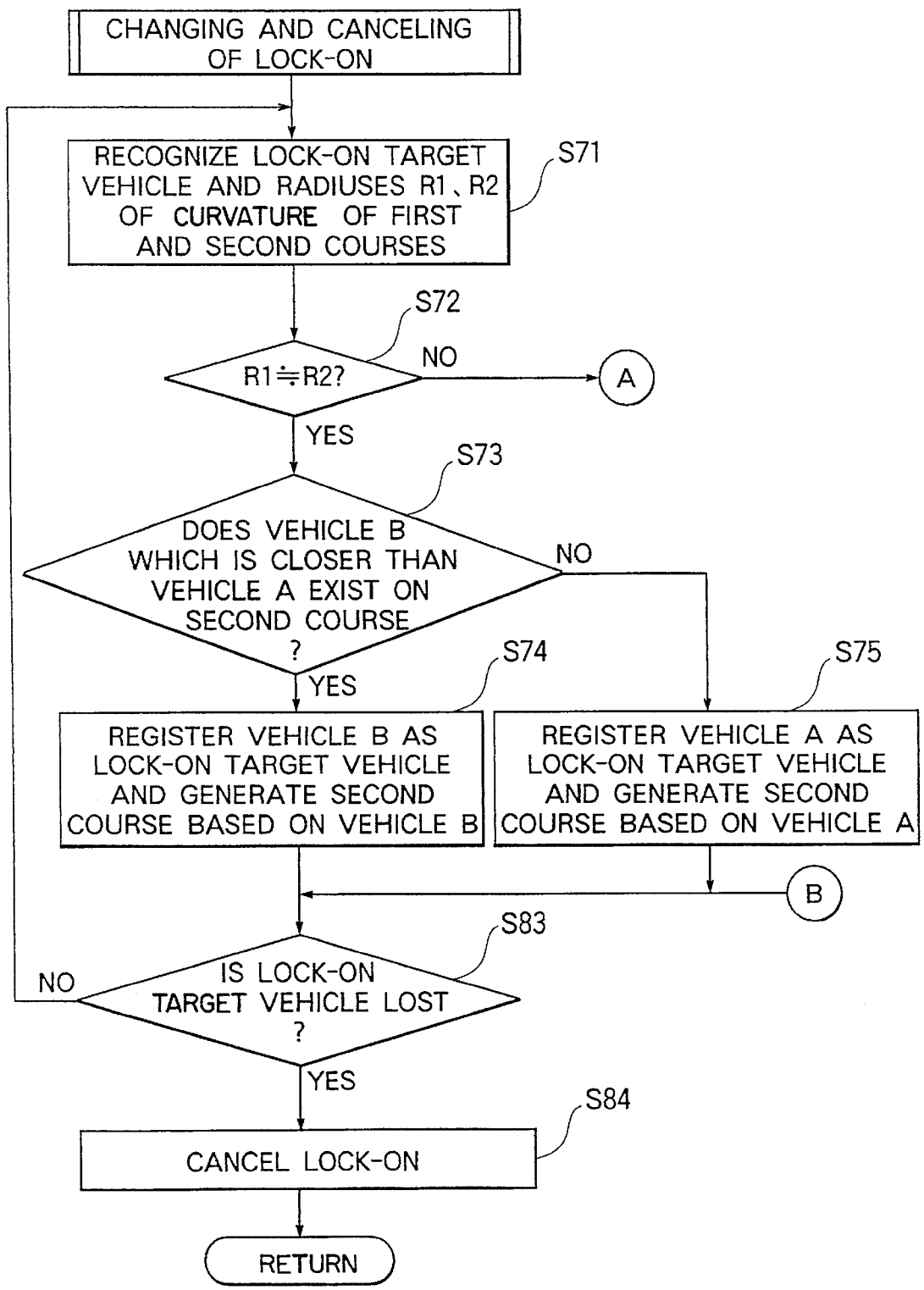
FIGS. 7 and 8 are flow charts showing a subroutine for changing and canceling the lock-on in accordance with the first embodiment of the present invention.
Figure 8:
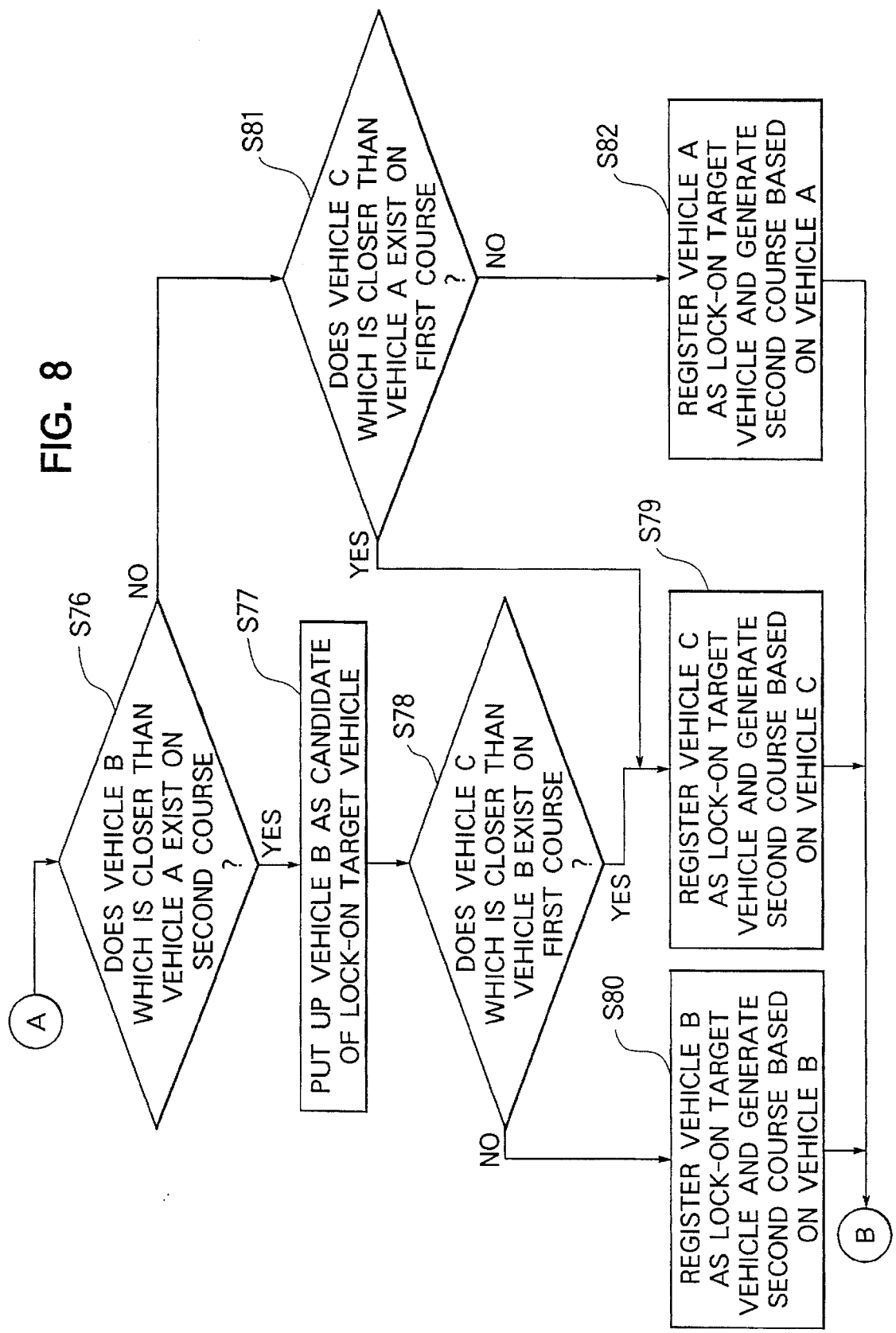

As shown in FIG. 3, in this main routine, a first course K1 is estimated in step S1, a lock-on target vehicle, which is a vehicle to be followed up by the vehicle M, is registered in step S3, a lock-on is carried out or a second course K2 is estimated in step S5, and the lock-on target vehicle is changed and canceled in step S7. A subroutine of the estimation of the first course K1 is shown in FIG. 4, a subroutine of the registration of the lock-on target vehicle is shown in FIG. 5, a subroutine of the carrying out of the lock-on is shown in FIG. 6, and a subroutine of the changing and canceling of the lock-on target vehicle is shown in FIGS. 7 and 8.

(Estimation of the first course K1)

Figure 4:
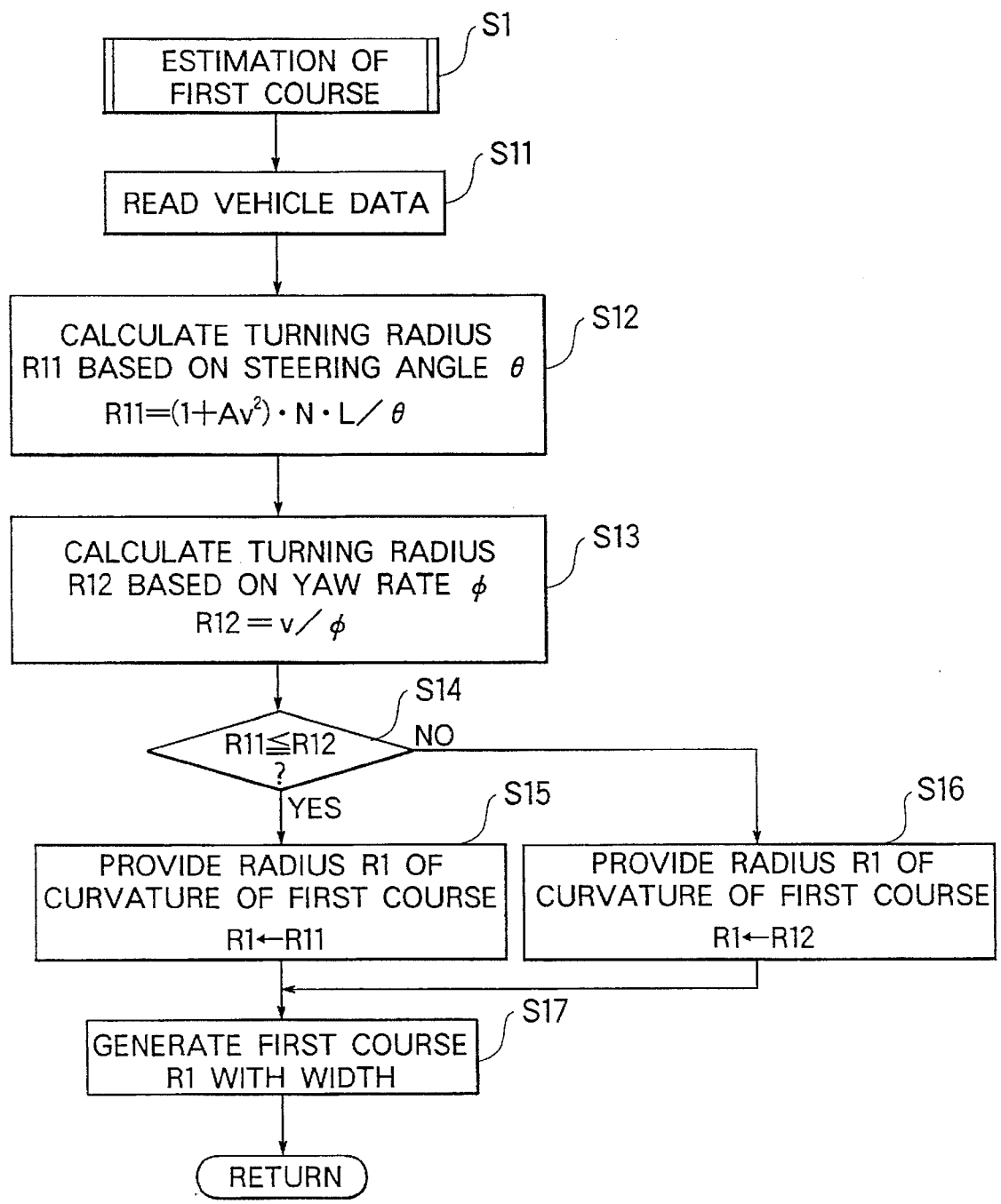
FIG. 4 is a flow chart showing a subroutine for an estimation of a first course in accordance with the first embodiment of the present invention.

Referring to FIG. 4, data of the vehicle M including a steering angle θ, a vehicle speed v and a yaw rate φ are read in step S11, and then a turning radius R11 is calculated based on the steering angle θ by using a following equation in step S12:

$$R11=(1A \cdot v^2) \cdot N \cdot L/\theta$$

where

A is a stability factor,

N is a steering gear ratio, and

L is a length of wheel base.

Next, a turning radius R12 is calculated based on the yaw rate φ by using a following equation in step S13:

$$R12=v/\phi$$

Then, in step S14, it is determined which turning radius R11 or R12 is smaller. When the turning radius R11 is smaller than the turning radius R12, the turning radius R11 is provided as the turning radius R1 of the first course K1 in step 15. On the other hand, when the turning radius R12 is smaller than the turning radius R11, the turning radius R12 is provided as the turning radius R1 of the first course K1 in step 16. That is, the smaller turning radius R11 or R 12 is provided as the turning radius R1 of the first course K1 so as to avoid response delays of the sensors and switches. Finally, the first course K1 is generated by adding a predetermined width to the turning radius R1 in step S17. This subroutine is carried out by the first course estimation means 22 in the control unit 4. (Registration of the lock-on target vehicle)

Referring to FIG. 5, data of the object which exists in front of the vehicle M are read in step S31. The data includes the distance between the object and the vehicle M and the direction of the object. Then, it is determined whether or not the data are detected continuously in step S32. If answer is YES in step S32, it is determined whether or not the data of the object are in a predetermined area and the data have more certainty than a predetermined value in step S33. The certainty corresponds to numbers of the object being detected per second. Where the object is one whose certainty is less than the predetermined value or which expands to outside of the predetermined area, such object is not determined as an object. If the answers are YES in Steps 32 and 33, an object identification number is given to the object in step S34.

Next, in step S35, it is determined whether or not the object with the identification number is a moving object. Namely, the object is determined as a moving object when the speed of the object is more than a predetermined threshold. The speed of the object is obtained by the distance between the object and the vehicle M and the speed of the vehicle M. Next, in step S36, it is determined whether or not the object exists on the first course K1. If the answers are YES in steps 35 and 36, since the object is a vehicle traveling in front of the vehicle M on the first course K1, the vehicle traveling ahead is put up as an candidate of a lock-on target vehicle in step S37.

Thereafter, in step S38, it is determined whether or not the vehicle ahead as the candidate of lock-on target vehicle is closest to the vehicle M among other vehicles on the first course K1. If the answer is YES in step S38, the vehicle ahead as the candidate is registered as the lock-on target vehicle in step S39. This subroutine is carried out by the vehicle ahead identification means 23 in the control unit 4.

(Carrying out of the lock-on)

Referring to FIG. 6, after it is determined that the lock-on target vehicle is registered in step S51, a radius R2 of curvature of the second course K2 is calculated by using a following equation:

$$R2=L/2\sqrt{(1-\cos^2\theta)}$$

Figure 9:
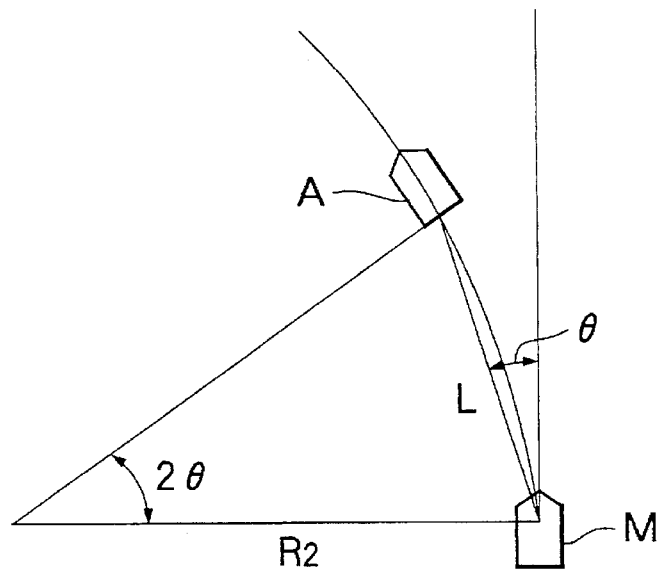
FIG. 9 is a plan view for explaining how to estimate a second course in accordance with the first embodiment of the present invention.

Referring to FIG. 9, the second course K2 is a course of the vehicle M estimated based on the location of the vehicle A traveling ahead of the vehicle M. L is a distance between the vehicles A and M, and θ is an angle defined by a line connecting the vehicles A and M and a line showing the moving direction of the vehicle M or a center line in the front and back directions.

Then, the second course K2 is generated by adding a predetermined width to the radius R2 of curvature in step S53. Finally, the lock-on is carried out in step S54. The lock-on means that the vehicle M follows up the lock-on target vehicle so that the vehicle M keeps a predetermined distance from the lock-on target vehicle and a same speed as that of the lock-on target vehicle. The lock-on is carried out by the vehicle speed control unit 25 in the control unit 4. The estimation of the second course of the vehicle M is carried out by the second course estimation means 24 in the control unit 4.

(Changing and canceling of the lock-on)

Figure 10:
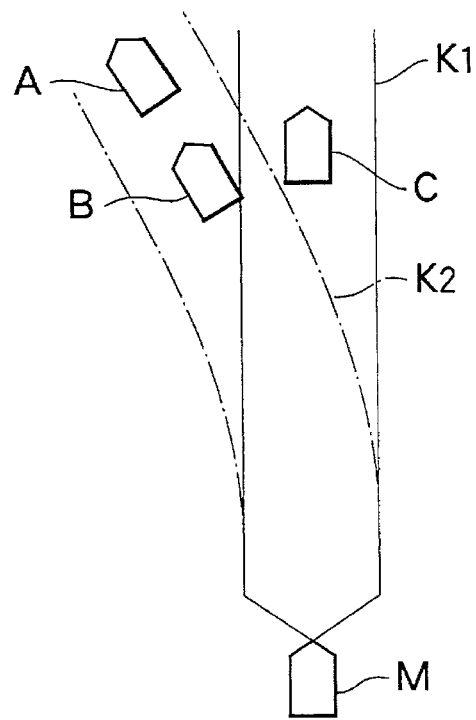
FIG. 10 is a plan view showing a case in which the first course is different from the second course in accordance with the first embodiment of the present invention.

The subroutine of changing and canceling of the lock-on will be explained with reference to FIGS. 7, 8 and 10.

Referring to FIGS. 7 and 8, the lock-on target vehicle A and radiuses R1 and R2 of curvatures of the first and second courses K1 and K2 are recognized in step S71. Then, it determined whether or not the radius R1 is curvature approximately equal to the radius R2 of curvature step S72. That is, where the radius R1 is approximately equal to the radius R2, the lock-on target vehicle A exists on the first course K1. If the answer is YES in step S72, it is determined in step S73 whether or not a vehicle B, which is closer to the vehicle M than the lock-on target vehicle A, exists on the second course K2. In step S73, the second course K2 is equal to the first course K2. If the answer is YES in step 73, the vehicle B is registered as a lock-on target vehicle and a second course K2 is generated based on the vehicle B in step S74. On the other hand, if the answer is NO in step 73, the vehicle A is registered as the lock-on target vehicle and the second course K2 is generated based on the vehicle A in step S75.

On the contrary, if the answer is NO in step S72, that is, the lock-on target vehicle A leaves the first course K1, it is determined in step S76 whether or not a vehicle B, which is closer to the vehicle M than the lock-on target vehicle A, exists on the second course K2. If the answer is YES in step S76, the vehicle B is put up as a candidate of a lock-on target vehicle in step S77. Then, it is determined in step S78 whether or not a vehicle C, which is closer to the vehicle M than the lock-on target vehicle B, exists on the first course K2. If the answer is YES in step S78, the vehicle C is registered as a lock-on target vehicle and a second course K2 is generated based on the vehicle C in step S79. If the answer is NO in step S78, the vehicle B is registered as a lock-on target vehicle and a second course K2 is generated based on the vehicle B in step S80.

If the answer is NO in step S76, it is determined in step S81 whether or not a vehicle C, which is closer to the vehicle M than the lock-on target vehicle A, exists on the first course K2. If the answer is YES in step S81, the procedure proceeds to step S79 in which the vehicle C is registered as a lock-on target vehicle and a second course K2 is generated based on the vehicle C. If the answer is NO in step S81, the vehicle A is registered as the lock-on target vehicle and the second course K2 is generated based on the vehicle A in step S82.

In short, when the lock-on target vehicle A leaves the first course K1, a vehicle which is closest to the vehicle M among the vehicle C on the second course K2 and the vehicles A and B on the first course K1 is identified as a lock-on target vehicle by the vehicle ahead identification means 23 in the control unit 4.

After one of the vehicles A, B and C is registered as the lock-on target vehicle and the second course is generated based on the lock-on target vehicle in steps S74, S75, S80 and S82, it is determined in step S83 whether or not the lock-on target vehicle is lost. If the lock-on target vehicle is not lost in step S83, the procedure proceeds to step S 72 to continue the lock-on. If the lock-on target vehicle is lost in step S83, the lock-on is canceled in step S84. Until the lock-on target vehicle is registered after the lock-on vehicle is canceled, the vehicle M is controlled so as to travel at a predetermined speed by the vehicle speed control unit 25.

According to the first embodiment of the present invention, when the vehicle M travels and follows up the vehicle ahead such as the vehicle A which is a lock-on target vehicle, the first course estimation means 22 estimates the first course K1 based on the driving conditions including steering angle θ, the yaw rate φ and the vehicle speed v of the vehicle M, and the second course estimation means 23 estimates the second course K2 based on the distance between the vehicle A and the vehicle M.

When the vehicle M travels on a straight road or on a constantly curved road, the first course K1 is approximately equal to the second course K2. In this case, the vehicle ahead identification means 23 identifies a vehicle which is closest to the vehicle M among vehicles traveling ahead of the vehicle M on the second course K2, and registers the vehicle ahead identified as a lock-on target vehicle as shown in steps S74 and S75 in FIG. 7. As a result, when a vehicle newly enters into the second course and travels between the vehicle M and the lock-on target vehicle A, the traveling control system detects the entering vehicle in an early stage and can avoid a contact with the entering vehicle by sounding an alarm or braking automatically.

On the other hand, when the vehicle A enters into a curved road and at that moment the vehicle M is still traveling on a straight road, the vehicle A leaves the first course K1 and the first course K1 becomes different from the second course K2. In this case, the vehicle ahead identification means 23 identifies a vehicle which is closest to the vehicle M among the vehicle C traveling ahead of the vehicle M on the second course K2 and the vehicles A and C traveling ahead of the vehicle M on the first course K1, and registers the vehicle ahead identified as a lock-on target vehicle as shown in steps S76 through S82 in FIG. 8. As a result, when a vehicle B newly enters into the second course and travels between the vehicle M and the lock-on target vehicle A, the traveling control system detects the entering vehicle B in an early stage and can avoid a contact with the entering vehicle B by sounding an alarm or braking automatically. Further, even if the lock-on target vehicle A turns into a byroad from the first course K1, the vehicle M can detects the vehicle C traveling ahead on the first course K1 and avoid a contact with the vehicle C safely.

Next, another example of the first embodiment of the present invention will be explained with reference to FIG. 11. This example corresponds to the changing and canceling of the lock-on by the vehicle ahead identification means 23 which is shown in FIG. 8.

In this example, when the lock-on target vehicle A leaves the first course K1 and as a result the radius R1 of the first course K1 is different from the radius R2 of the second course K2 or the answer in step S72 in FIG. 7 is NO, the vehicle ahead identification means 23 identifies a vehicle which is closest to the vehicle M among vehicles traveling ahead on the second course K2 during a predetermined time period or t second. Further, when the lock-on target vehicle A does not return to the first course K1 within the predetermined time period, the vehicle ahead identification means 23 identifies a vehicle which is closest to the vehicle M among the vehicles traveling ahead on the first course K1 after the predetermined time period has passed.

Figure 11:
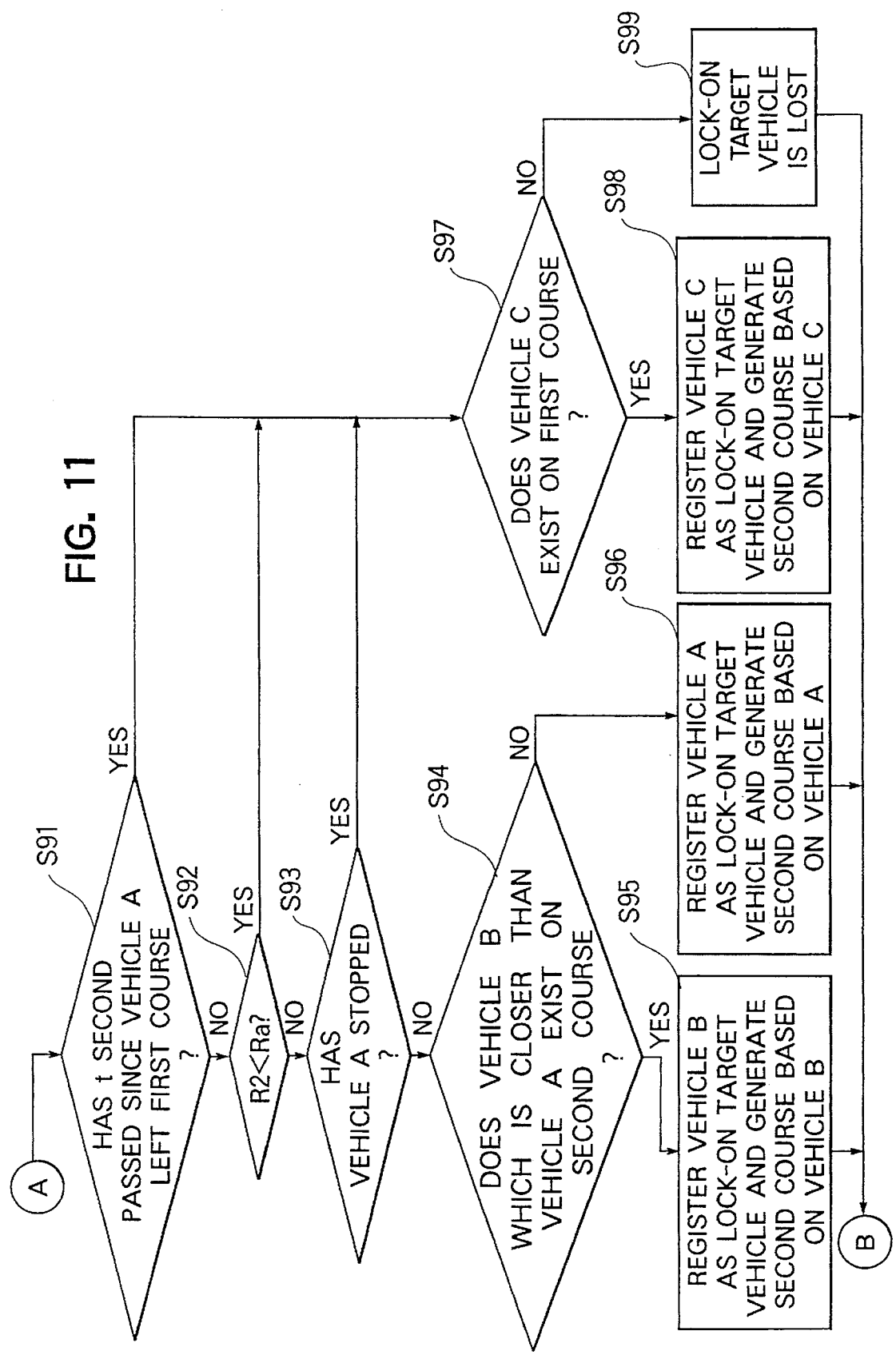
FIG. 11 is a flow chart showing another example of the first embodiment of the present invention and corresponds to FIG. 8.
Figure 12:
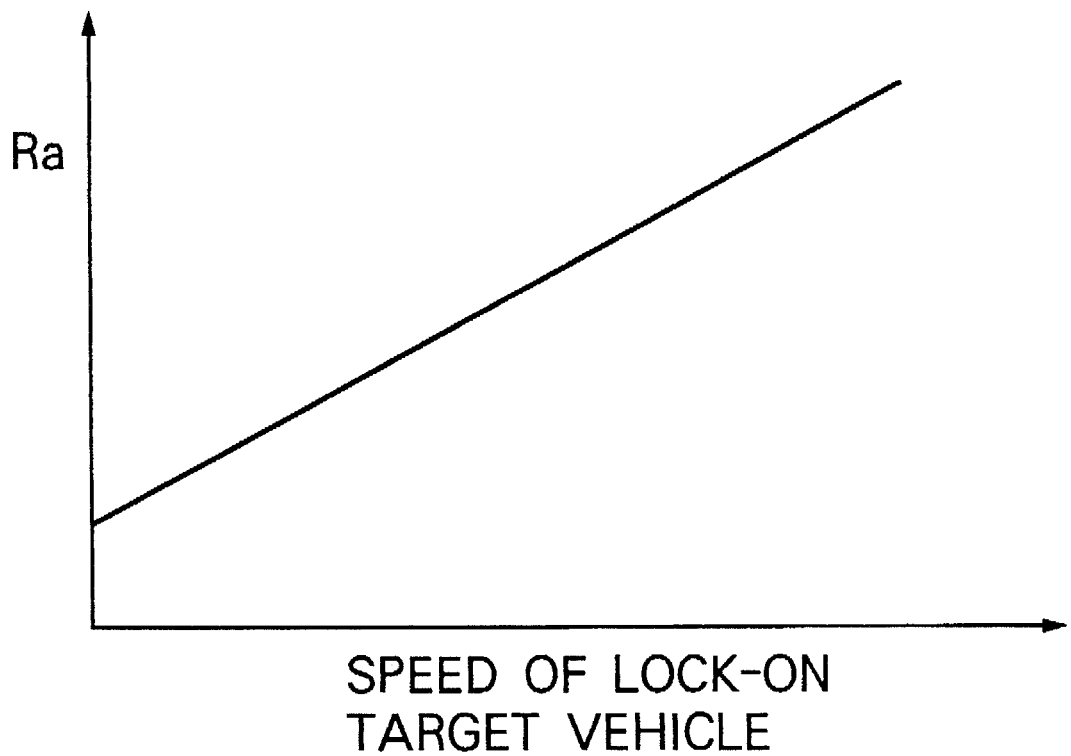
FIG. 12 is a graph showing the relationship between a predetermined value Ra and the speed of a lock-on target vehicle in accordance with the first embodiment of the present invention.

Referring to FIG. 11, in this example, when the radius R1 of the first course K1 is different from the radius R2 of the second course K2 or the answer is NO in step S72 in FIG. 7, it is determined in step S91 whether or not the predetermined time period or t second has passed since the lock-on target vehicle A left the first course K1. The predetermined time period is a time period for which the vehicle A reaches at the point where the lock-on vehicle A left the first course K1 and is given by a following equation:

$$t=(L/v)+\alpha$$

where

L is a distance between the lock-on target vehicle A and the vehicle M at the time of the vehicle A leaving the first course K1, v is a vehicle speed of the vehicle M and α is a correction value obtained by characteristics of pitching and the like and sensor characteristics.

Next, if the answer is NO in step S92, it is determined in step S92 whether or not hot the radius R2 of curvature of the second course K2 is less than a predetermined value Ra, and it is further determined in step S93 whether or not the lock-on target vehicle A has stopped and the speed of the vehicle A is about zero. The predetermined value Ra is given by FIG. 12 so as to increase linearly as the speed of the lock-on target vehicle A increases. Generally, when the vehicle turns on the curved road, the radius of the curvature of the vehicle becomes relatively large as same as the radius of the curved road. Therefore, when the radius R2 of the second road K2 is less than the predetermined value Ra, the lock-on target vehicle A is considered not to enter into the curved road but to turn quickly by one reason.

Then, if the answers in steps S92 and S93 are NO, it is determined in step S94 whether or not a vehicle B, which is closer to the vehicle M than the lock-on target vehicle A, exists on the second course K2. If the answer is YES in step 94, the vehicle B is registered as a lock-on target vehicle and a second course K2 is generated based on the vehicle B in step S95. On the other hand, if the answer is NO in step S94, the vehicle A is registered as the lock-on target vehicle and the second course K2 is generated based on the vehicle A in step S96.

When it is determined that the predetermined time period or t second has passed in step S91, it is determined in step S97 whether or not the vehicle C traveling ahead exists on the first course K1. If the answer is YES in step S97, the vehicle C is registered as a lock-on target vehicle and a second course K2 is generated based on the vehicle C in step S98. If the answer is NO in step S97, it is thereafter determined that the lock-on target vehicle is lost in step S99. Further, if the answer is YES in step S92 or step S93, the procedure proceeds to step S97.

According to the another example of the first embodiment of the present invention explained above, when the lock-on target vehicle A traveling ahead leaves the first course K1 and as a result the radius R1 of the first course K1 is different from the radius R2 of the second course K2, the vehicle ahead identification means 23 identifies the vehicle which is closest to the vehicle M among vehicles traveling ahead on the second course K2 during the predetermined time period or t second. Further, when the lock-on target vehicle A does not return to the first course K1 within the predetermined time period, the vehicle ahead identification means 23 identifies the vehicle which is closest to the vehicle M among the vehicles traveling ahead on the first course K1 after the predetermined time period has passed. As a result, the traveling control system can detect a vehicle which newly enters into the curved road and travels ahead in an early stage. Further, since only one course of the course K1 or K2 is necessary to detect the vehicle which is closest to the vehicle M, the vehicle ahead can be detected accurately and quickly.

When the radius R2 of the second road K2 is less than the predetermined value Ra and therefore the lock-on target vehicle A is considered not to enter into the curved road but to turn quickly by one reason, or when the lock-on target vehicle A has stopped after leaving the first course K1, the traveling control system detects the vehicle which is closest to the vehicle M among the vehicles traveling ahead on the first course K1. Therefore, the traveling control system can prevent from detecting a wrong vehicle traveling ahead as a lock-on vehicle based on a wrong course.

In the first embodiment of the present invention, the radar device 7 is a scanning type device which scans an extreme infrared radiation as a radar wave in a wide range in a horizontal direction, as explained above. The radar device 7 may be a device which detects an object in a relatively small range and is rotated along a vertical axis by an actuator.

Figure 13:
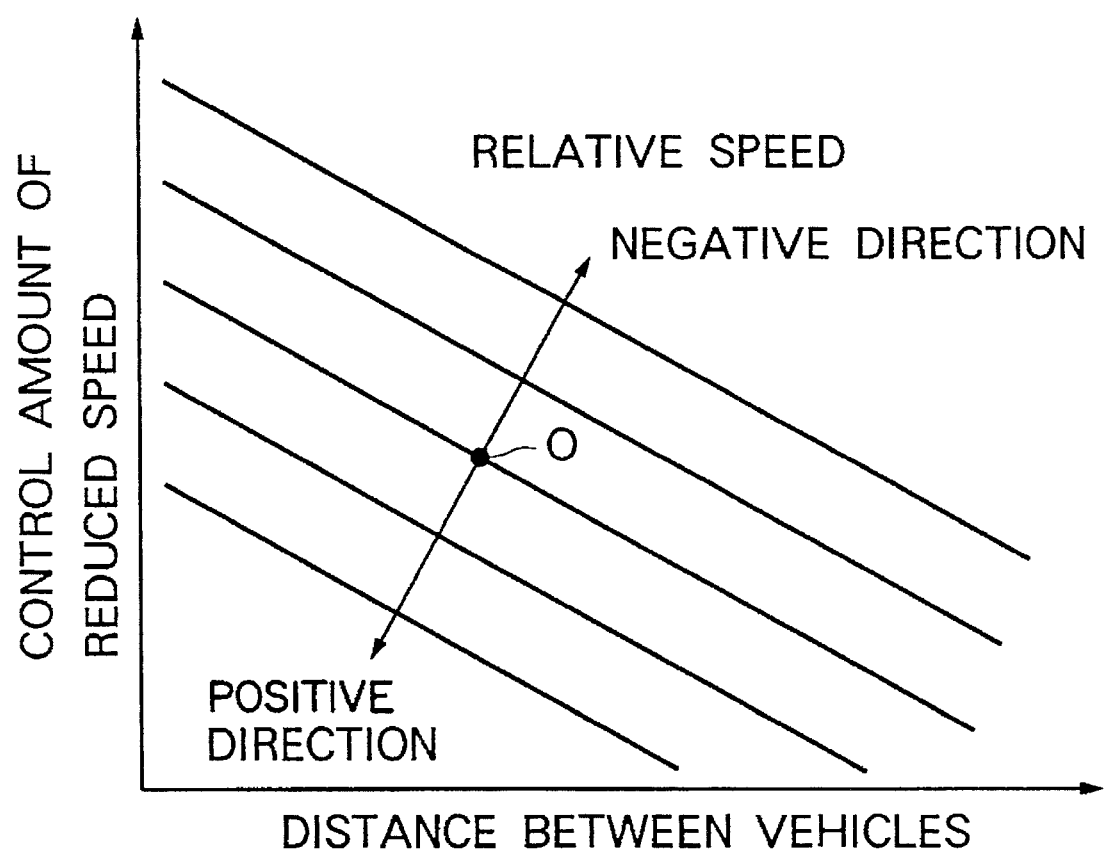
FIG. 13 is a graph showing the relationship between a control amount of a reduced speed and a distance between vehicles in accordance with the first embodiment of the present invention.

In the first embodiment of the present invention, when the vehicle ahead identification means 23 identifies the vehicle as a lock-on target vehicle among the vehicle C traveling ahead on the first course K1 and the vehicles A and B traveling on the second course K2, the lock-on target vehicle is identified based on sizes of the distances between the vehicle M and the respective vehicles A, B and C, as explained above. According to the first embodiment of the invention, the lock-on target vehicle may be identified based on sizes of relative speeds between the vehicle M and the respective vehicles A, B and C or based on sizes both of distances and relative speeds between the vehicle M and the respective vehicles A, B and C. When the lock-on target vehicle is identified based on the distances and relative speeds between the vehicle M and the respective vehicles A, B and C, control amounts of reduced speed in the vehicle M regarding the vehicles A, B and C are obtained based on the distances and relative speeds between the vehicle M and the respective vehicles A, B and C by using a map shown in FIG. 13. In FIG. 13, if the vehicle M becomes close to the vehicle traveling ahead such as vehicle A, the relative speed between the vehicle ahead and the vehicle M moves to the negative direction on the map. In this case, the control amount of reduced speed in the vehicle M becomes large. If the vehicle ahead goes away from the vehicle M, the relative speed between the vehicle ahead and the vehicle M moves to the positive direction on the map. In this case, the control amount of reduced speed in the vehicle M becomes small. Thereafter the vehicle ahead, regarding which the control amount of reduced speed in the vehicle M is largest, is identified as a lock-on target vehicle.

Next, a second embodiment of the present invention will be explained with reference to FIGS. 14–19.

In the first embodiment of the present invention, the first course K1 is estimated based on the driving conditions including a vehicle speed, a steering angle and a yaw rate of the vehicle M by the first course estimation means 22. On the other hand, in the second embodiment of the present invention, the first course is estimated based on a stationary object such as a roadside reflector by a first course estimation means 30, as explained below. Only the elements of the second embodiment which are different from those of the first embodiment will be explained below.

Figure 14:
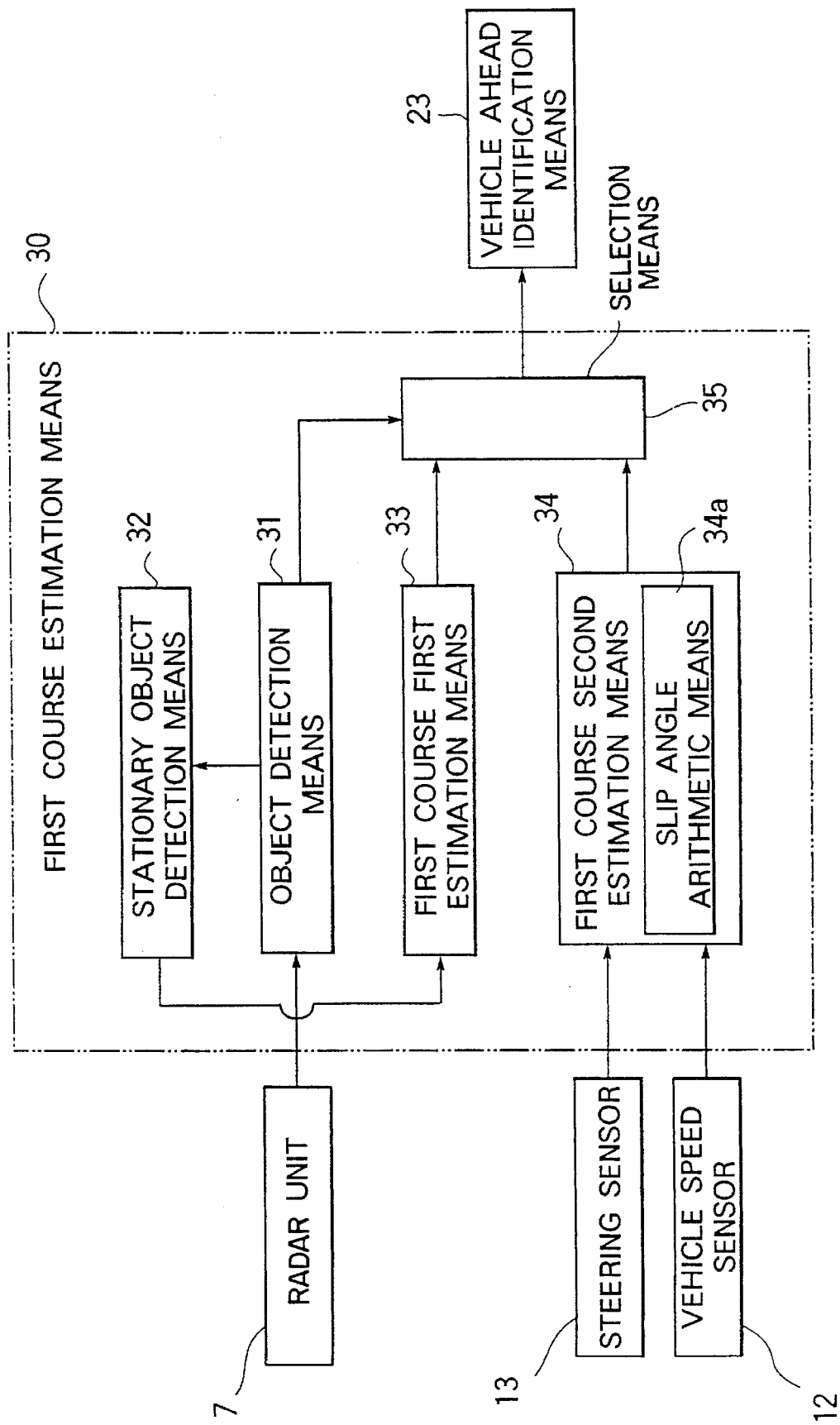
FIG. 14 is a block diagram showing a control unit of a traveling control system for a motor vehicle in accordance with a second embodiment of the present invention.

Referring to FIG. 14, the first course estimation means 30 includes an object detection means 31 which detects an object existing ahead of the vehicle M by receiving the output signal from the radar device 7, a stationary object detection means 32 which detects a stationary object existing ahead of the vehicle M by receiving the output signal from the object detection means 31, and a first course second estimation means 33 which estimates a radius R12 of a first course K1 based on stationary object's property when the stationary object detection means 32 detects the stationary object in front of the vehicle M. The stationary object's property includes a distance L between the vehicle M and the stationary object, a direction $\phi$ of the stationary object seen from the vehicle M, and a relative speed and a lateral moving speed vt between the vehicle M and the stationary object. These are easily obtained based on the signals from the radar unit 7, the vehicle speed sensor 12 and the steering angle sensor 13 as follows:

$$R12 = L \cdot (v \cdot \cos\phi / vt - \sin\phi)$$

The first course estimation means 30 further includes a first course first estimation means 34 which estimates a radius R11 of a first course K1 based on a vehicle speed v and a steering angle $\theta$ of the vehicle M, and a selection means for selecting the first course estimated by the first course first estimation means 34 when the stationary object detection means 32 does not detect the stationary object in front of the vehicle M. The first course first estimation means 34 includes a slip angle arithmetic means 34a which detects a slip angle $\beta 1$ of the vehicle M by using a following equation:

$$R11 = (1 + A \cdot v^2) \cdot N \cdot L / \theta$$

$$\beta 1 = \{-1 + m/2 \; mL \cdot Lf(Lr \cdot kf) \cdot v^2\} / (1 + A \cdot v^2) \cdot Lr/L \cdot \theta / N$$

where

A is a stability factor,

N is a steering gear ratio,

L is a wheel base length,

Lf is a distance between the center of gravity of the vehicle and a front wheel, Lr is a distance between the center of gravity of the vehicle and a rear wheel, m is mass of the vehicle and kf is cornering power per one rear wheel.

The first course first estimation means 34 uses the slip angle β1 when estimating the first course K1. Namely, a region Φ1 is a region from which the vehicle M can see the stationary object having a distance Li from the vehicle M and is calculated by a following equation:

$$\Phi 1 = Li/2R11 - \beta 1$$

Signals from the object detection means 31 and the selection means 35 are input to the vehicle ahead identification means 23.

Figure 15:
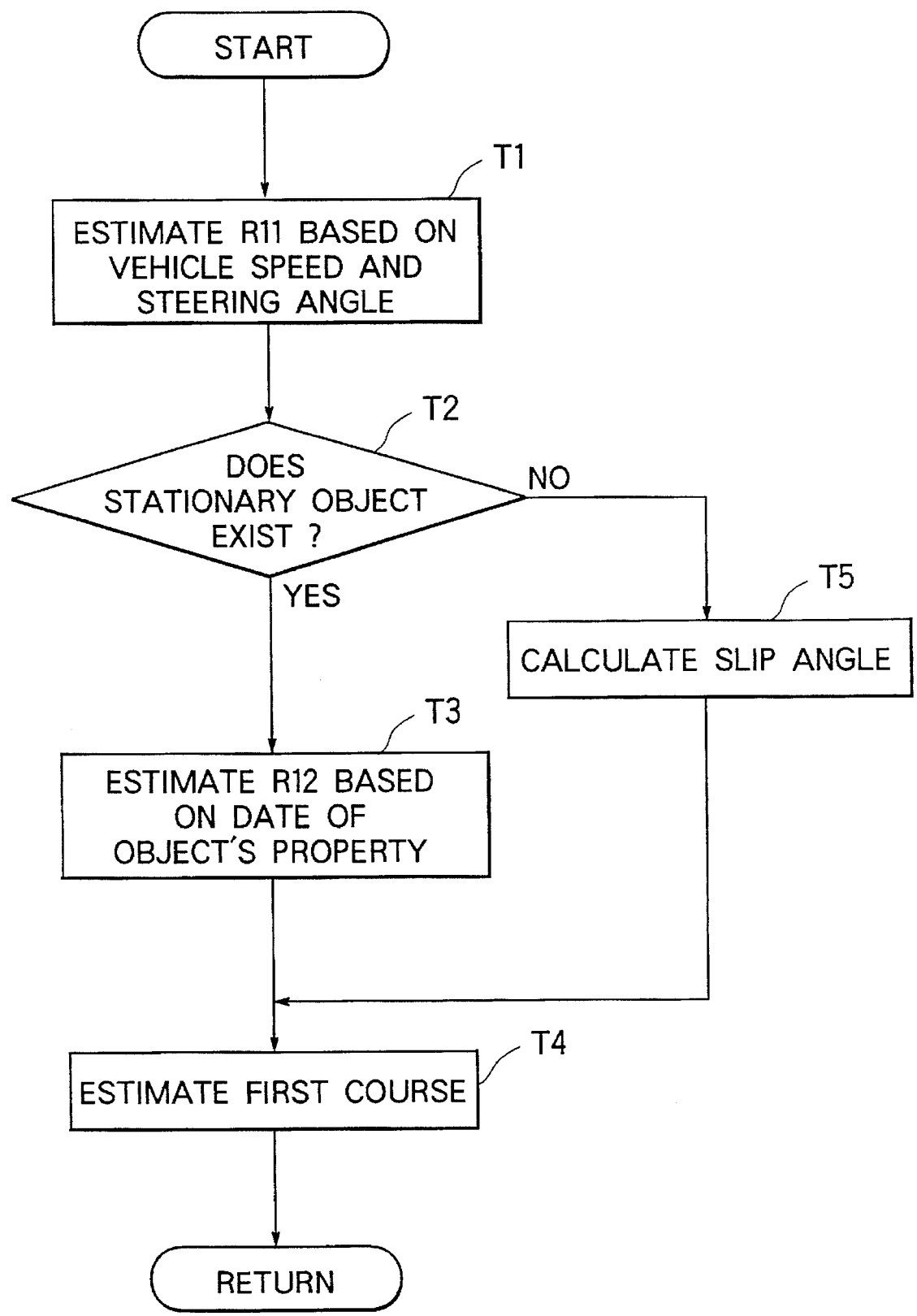
FIG. 15 is a flow chart showing a control routine in accordance with the second embodiment of the present invention.
Figure 16:
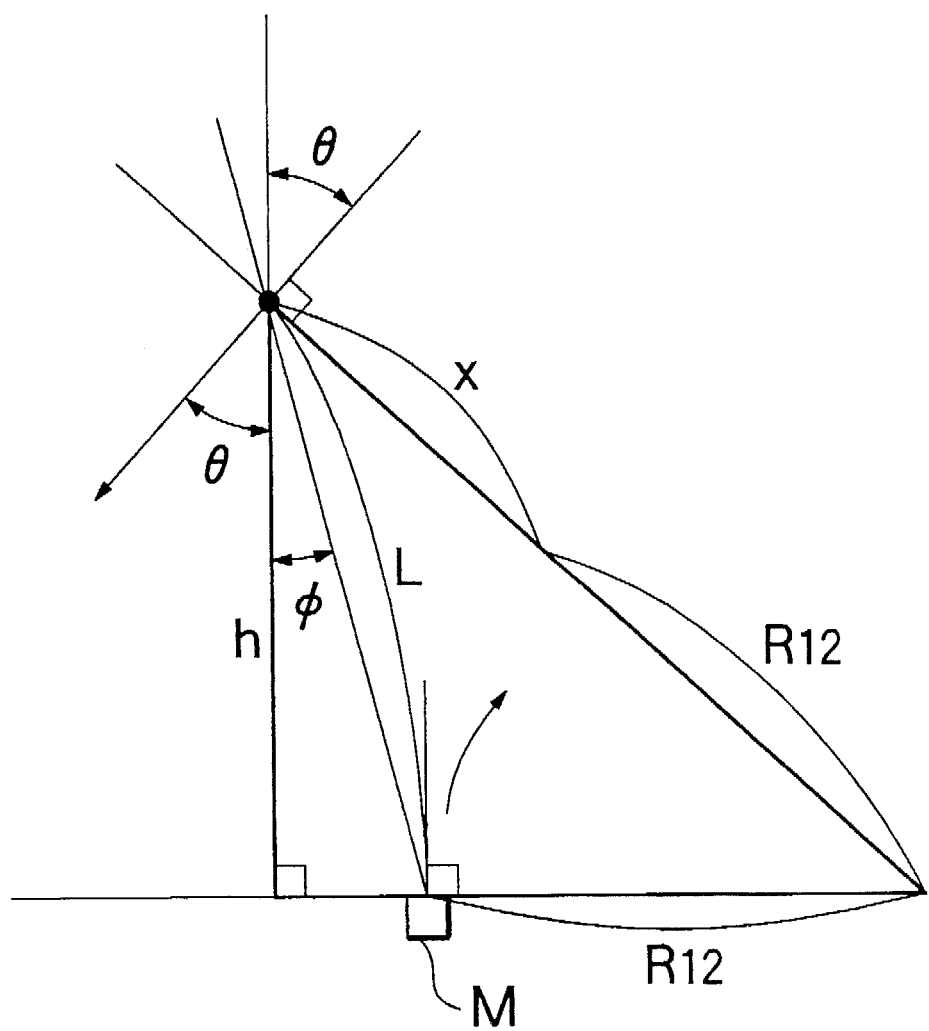
FIG. 16 is a plan view for explaining how to estimate a first course based on data of a stationary object's property in accordance with the second embodiment of the present invention.

Next, a control routine carried out by the first course estimation means 30 of the second embodiment of the invention will be explained with reference to FIG. 15.

The first course first estimation means 34 estimates a radius R11 of the first course K1 based on the vehicle speed and the steering angle and calculates a slip angle β1 by using above mentioned equations in step T1. Next, the stationary object detection means 32 determines whether or not the object which exists in front of the vehicle M and is detected by the object detection means 31 is a stationary object in step T2. If the object is a stationary object, the first course second estimation means 33 estimates a radius R12 of the first course K1 based on data of the stationary object's property by using the following equation in Step T3.

$$R12 = L \cdot (v \cdot \cos\phi/vt - \sin\phi)$$

This equation is obtained as follows (see FIG. 16):

$$\sin\theta = h/(R12 + x)$$
$$h = L \cdot \cos\phi$$
$$(R12 + x) \cdot \cos\phi = R12 + L \cdot \sin\phi$$
$$R12 + x = (R12 + L \cdot \sin\phi)/\cos\theta$$
$$\sin\theta = (L \cdot \cos\phi \cdot \cos\theta)/(R12 + L \cdot \sin\phi)$$
$$\sin\theta \cdot (R12 + L \cdot \sin\phi) = L \cdot \cos\phi \cdot \cos\theta$$
$$R12 = -L \cdot \sin\phi + L \cdot \cos\phi \cdot \cos\theta/\sin\theta$$
$$= L \cdot \cos\phi \cdot (1/\tan\theta) - L \cdot \sin\phi$$
$$= L \cdot (v/vt \cdot \cos\phi - \sin\phi)$$

where

L is a distance between the vehicle M and the stationary object,

φ is a direction of the stationary object from the vehicle M, v is a relative speed between the vehicle M and the stationary object and vt is a lateral moving speed between the stationary object and the vehicle M.

Next, in step T4, the first course K1 is estimated based on the radius R12 of the first course K1 which is estimated by the first course second estimation means 33.

On the other hand, if the stationary object does not exist, the slip angle is calculated by the slip angle arithmetic means 34a in step T4. Then, in step T5, the first course K1 is estimated based on the radius R11 of the first course K1 which is estimated by the first course first estimation means 34 and the slip angle calculated by the slip angle arithmetic means 34a.

In the second embodiment of the present invention, only one stationary object is utilized as explained above. Further, according to the second embodiment of the invention, when a plurality of stationary objects exists in front of the vehicle M, the first course estimation means 30 estimates a first course K1 based on the plurality of stationary objects.

This example utilizing the plurality of the stationary objects of the second embodiment of the present invention will be explained with reference to FIGS. 17 and 18.

Figure 17:
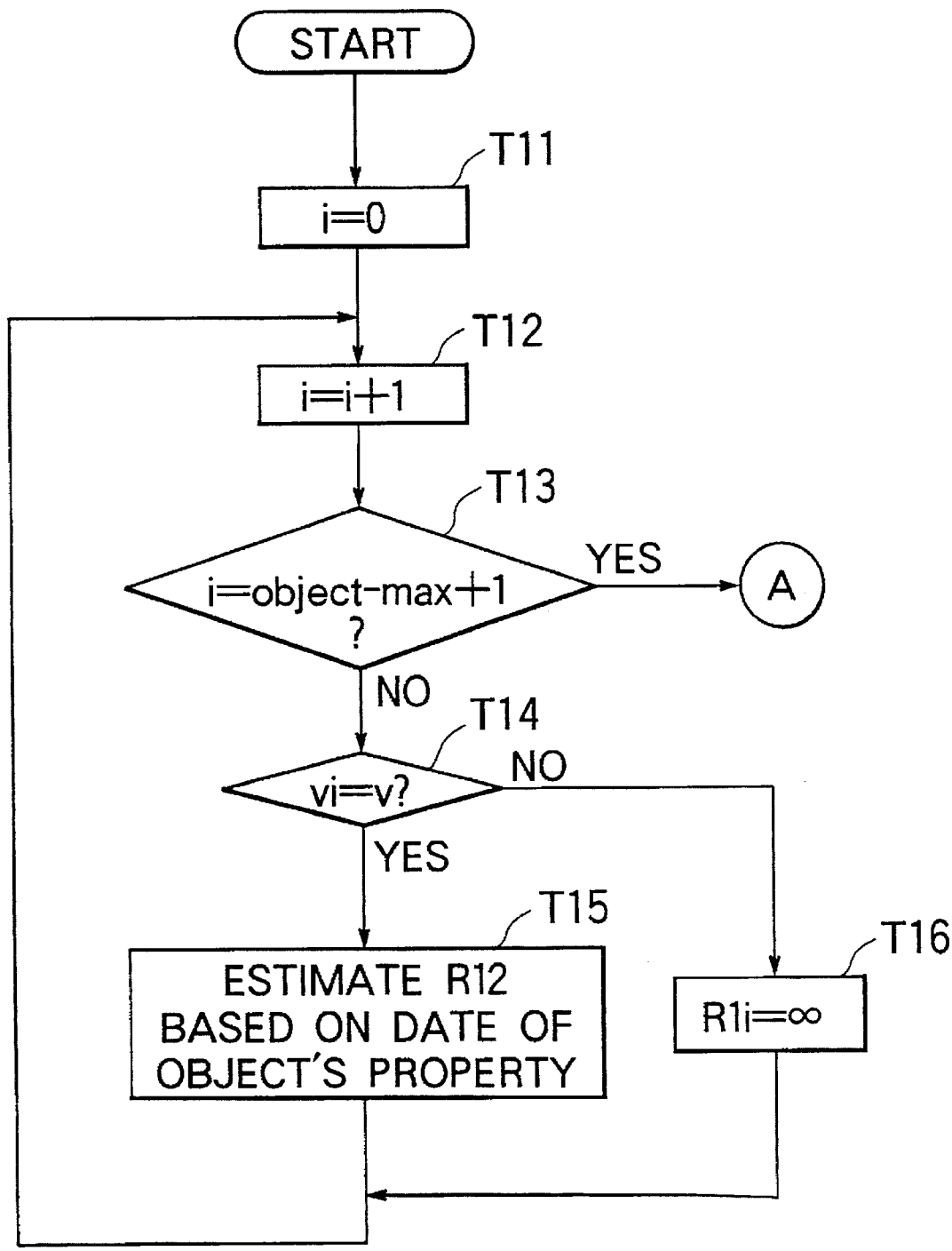
FIGS. 17 and 18 are flow charts showing another example of the second embodiment of the present invention.
Figure 18:
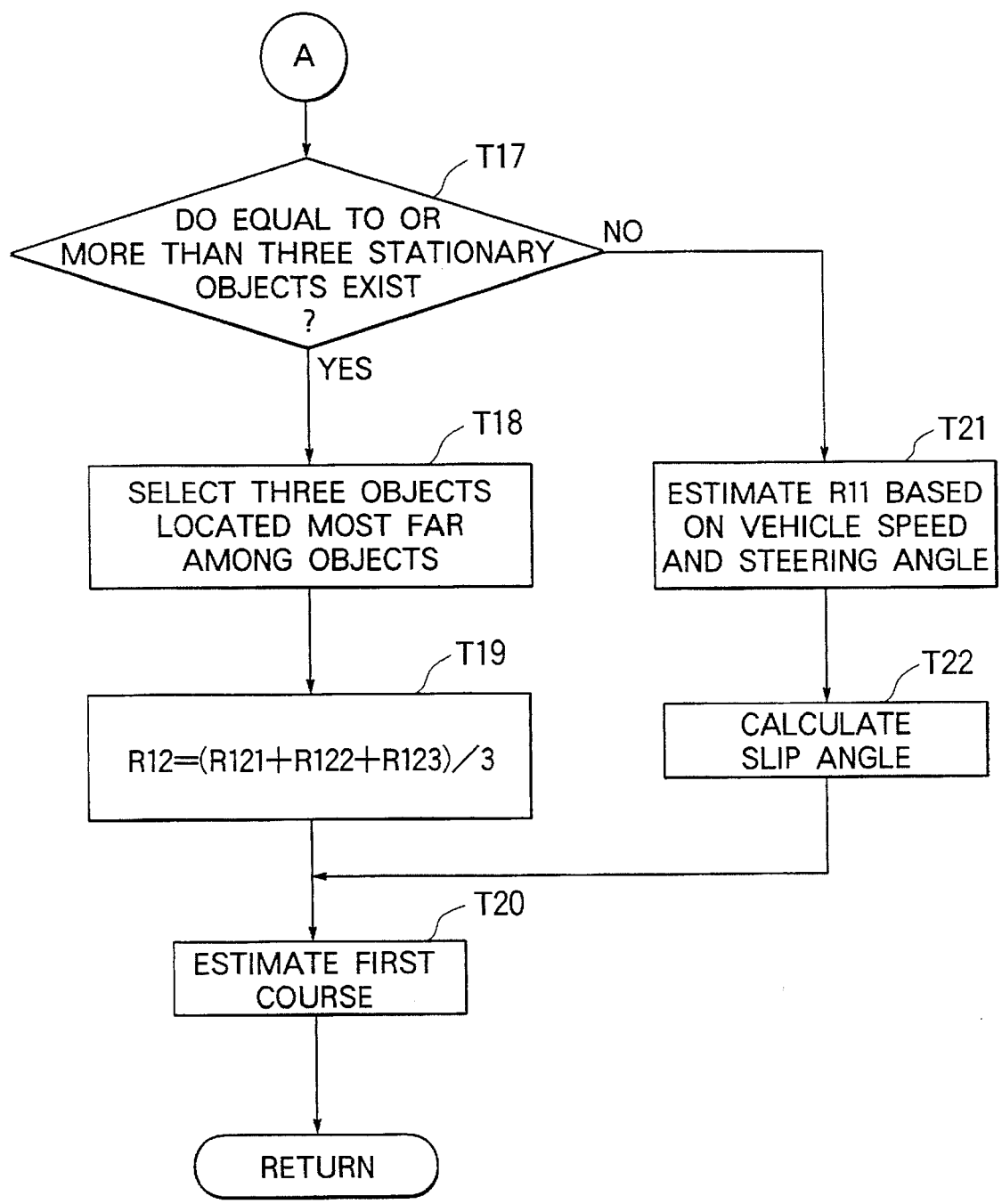

Referring to FIGS. 17 and 18, an object identification number i is reset to be zero in step T11, and then the object identification number i is increased by one to be "i+1" in step T12.

Next, it is determined whether or not the object identification number i is equal to the total number of the objects (object-max)+1 in step T13. If the answer is no in step T13, it is determined in step T14 whether or not a relative speed vi between the object i and the vehicle M is equal to the speed v of the vehicle M. If the relative speed vi is equal to the speed v, respective radiuses R12i of the stationary objects are estimated based on properties of the stationary objects by using a following equation:

$$R12i = Li \cdot (vi \cdot \cos\phi i/vti - \sin\phi i)$$

where

Li is a distance between the stationary object i and the vehicle M,

φi is a direction of the stationary object i from the vehicle M, vi is a relative speed between the stationary object i and the vehicle M, and vti is a lateral moving speed between the stationary object i and the vehicle M.

On the other hand, if the relative speed vi is not equal to the speed v, the object is a moving object. In this case, a radius Ri of curvature of the first course K1 is set to be infinite in step T16. After steps T15 or T16, the procedure returns back to step T12.

If the object identification number i is equal to the total number of the objects (object-max)+1 in step T13, it is determined in step T17 whether or not equal to or more than three stationary objects exist. If the answer is YES in step T17, three objects located farthest are selected among the all objects in step T18 and then the average R12 of radiuses R121, R122 and R123 estimated on these three stationary objects is obtained as the radius of curvature of the first course K1 in step T19. Thereafter, the first course K1 is estimated based on the radius R12 in step T20.

If the answer is NO in step T17, a radius R11 of the first course K1 is estimated based on the driving conditions including a vehicle speed and a steering angle by the first course first estimation means 34 in step T21, and then a slip angle is calculated in step T22. Thereafter, a first course K1 is estimated in step T20.

Next, another example of the second embodiment of the present invention will be explained with reference to FIG. 19. This example corresponds to steps T17 to T22 in FIG. 18.

Figure 19:
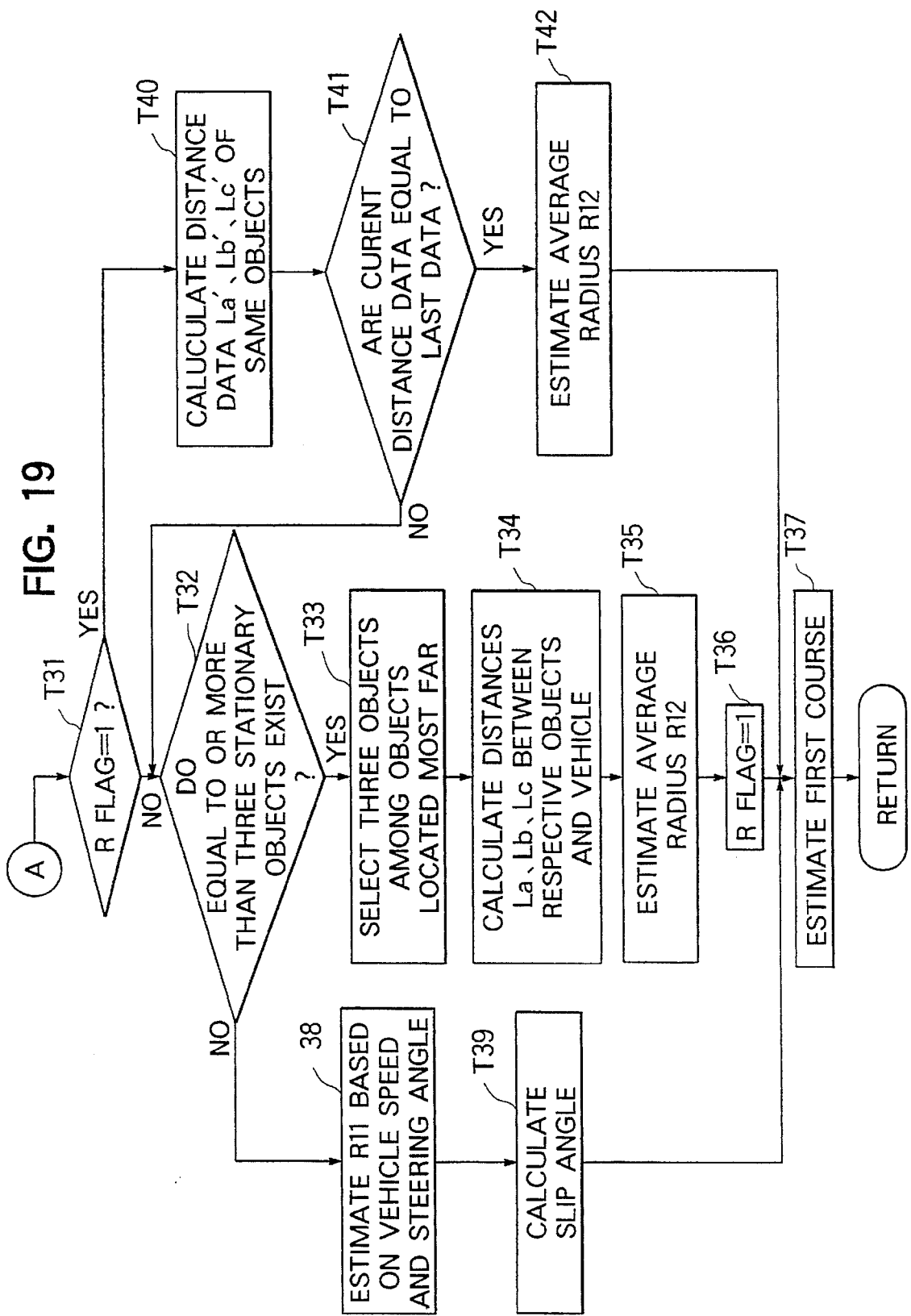
FIG. 19 is a flow chart showing still another example of the second embodiment of the present invention and corresponds to FIG. 18.

Referring to FIG. 19, in this example, when the object identification number i is equal to the total number of the objects (object-max)+1 in step T13 (see FIG. 17), it is determined whether or not R flag is equal to one in step T31. When R flag is not equal to one, it is determined in step T32 whether or not there are equal to or more than three stationary objects existing in front of the vehicle M. The step T31 is provided so that the procedure proceeds to step T32 at a first cycle.

When there are equal to or more than three stationary objects existing in front of the vehicle M in step T32, three objects are selected among the objects located farthest from the vehicle M in step T33. Then, respective distances La, Lb and Lc between the vehicle M and these three objects are calculated in step T34, and thereafter average radius R12 of the respective radiuses R121, R122 and R123, those of which are calculated based on the three objects, is estimated as a radius of the first course K1 in step T35. Then, R flag is set so as to be one in step T36. Thereafter, the first course K1 is estimated in step T37.

When there are less than three stationary objects in front of the vehicle M in step T32, a radius R11 of curvature of the first course K1 is estimated based on driving conditions including a vehicle speed and a steering angle of the vehicle M in step T38, and then a slip angle is calculated in step T39. Thereafter, the first course K1 is estimated in step T37.

On the other hand, when it is determined that R flag is equal to one in step T31, the procedure proceeds to step T40 in which respective distances La', Lb' and Lc' of the same objects as those selected in step T33 are calculated. Then, it is determined in step T41 whether or not the current data obtained in step T40 are equal to the last data obtained in step T34. When the current data are equal to the last data, it is considered that the three objects are stationary objects. When so, the procedure proceeds to step T42 in which average radius R12 of the respective radiuses R121, R122 and R123, those of which are calculated based on the three objects, is estimated as a radius of the first course K1 in step T42. Thereafter, the first course K1 is estimated in step T37. On the other hand, when the current data are not equal to the last data in step T41, the procedure proceeds to step T32.

According to the second embodiment of the invention, the stationary object detection means 32 detects the stationary object which exists in front of the vehicle M, and then the first course second estimation means 33 estimates the first course K1, on which the vehicle M is supposed to travel hereafter, based on the stationary object's property. Therefore, the first course K1 can be estimated without a yaw rate sensor by using effectively the stationary object's property.

According to the second embodiment of the invention, the first course K1 can be estimated by using the distance between the vehicle M and the stationary object, the direction of the stationary object from the vehicle M, and the relative speed and lateral moving speed between the vehicle M and stationary object those of which are easily detected as the stationary object's property.

According to the second embodiment of the invention, the first course K1 is estimated based on the driving conditions such as the vehicle speed and the steering angle by the first course first estimation means 34 other than the estimation by the first course second estimation means 33. As a result, even if there is no stationary object in front of the vehicle M, the first course K1 can be detected constantly by using the first course first estimation means 34.

According to the second embodiment of the invention, when there is no stationary object in front of the vehicle M, the first course first estimation means 34 can estimate effectively the first course K1 by using the slip angle of the vehicle M.

According to the second embodiment of the invention, the traveling control system can detect the first course K1 with accuracy by using a plurality of the stationary objects' properties.

Next, a third embodiment of the present invention will be explained with reference to FIGS. 20–23.

In the first embodiment of the present invention, the first course K1 is estimated based on the driving conditions including a vehicle speed, a steering angle and a yaw rate of the vehicle M. In the second embodiment of the present invention, the first course K1 is estimated based on the stationary object such as a roadside reflector. On the other hand, in the third embodiment of the present invention, the first course K1 is estimated based on driving conditions of a vehicle traveling in front of the vehicle M. Only the elements of the third embodiment which are different from those of the first embodiment will be explained below.

Figure 20:
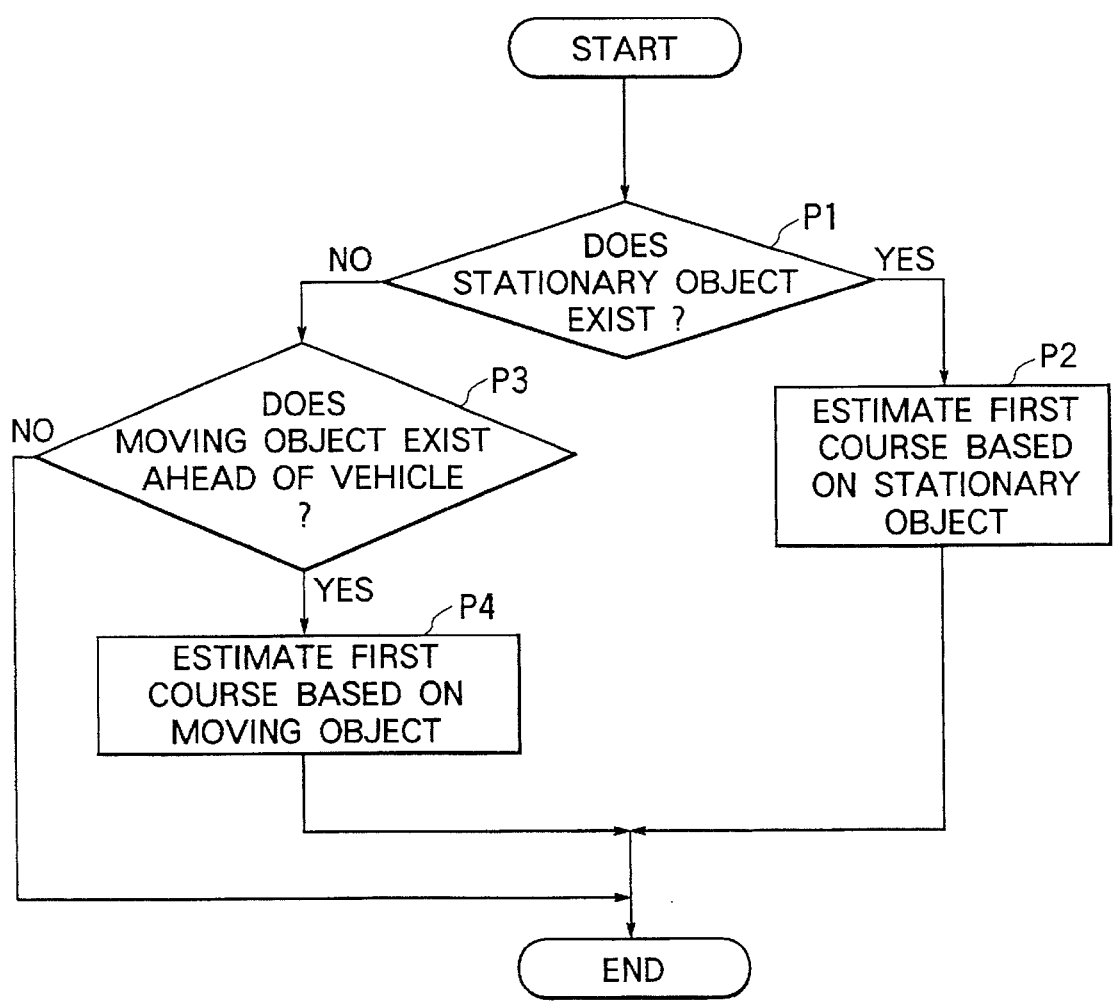
FIG. 20 is a flow chart showing a main control routine of a third embodiment of the present invention.
Figure 21:
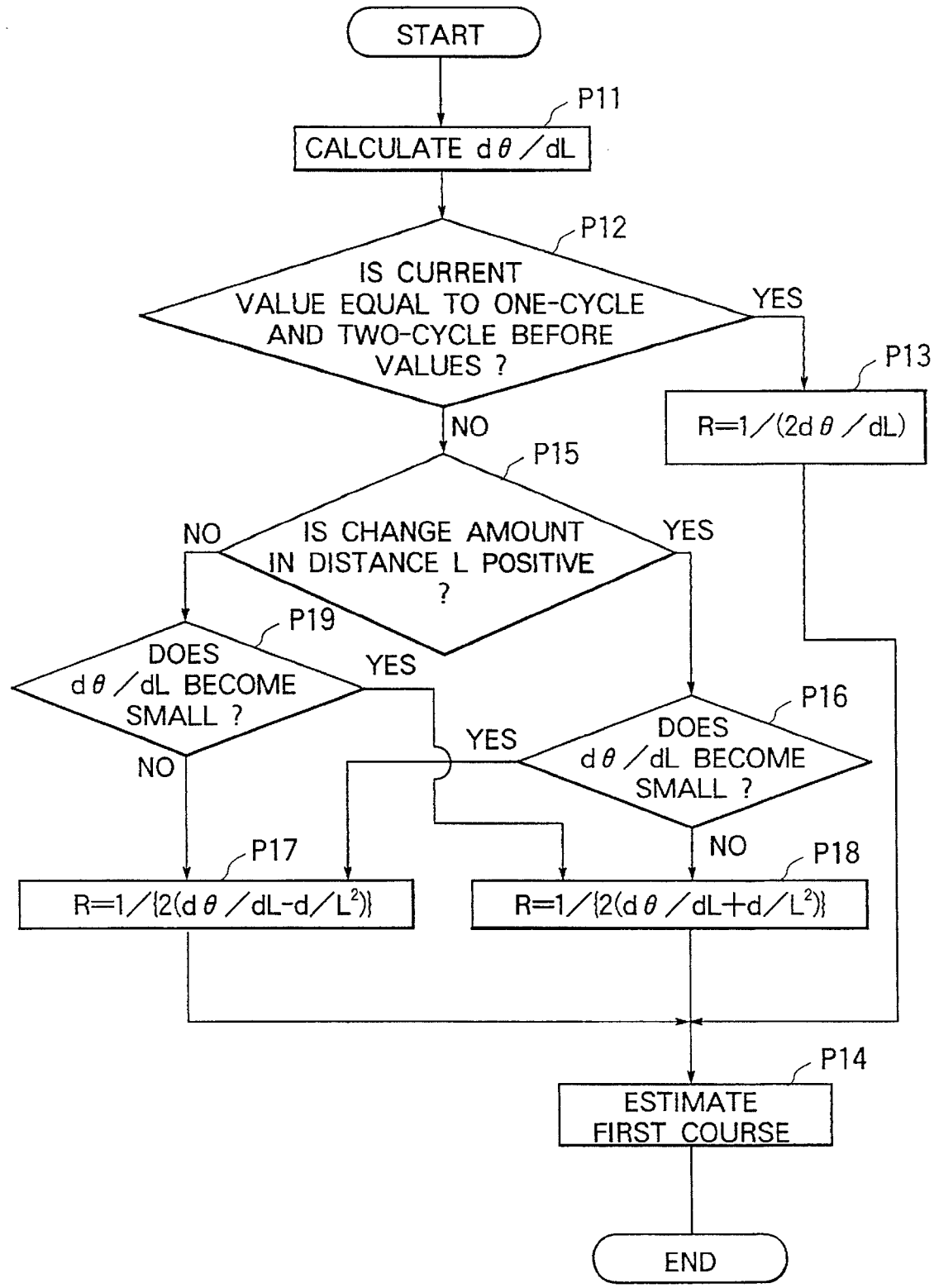
FIG. 21 is a flow chart showing a subroutine for estimating a first course in accordance with the third embodiment of the present invention.
Figure 22:
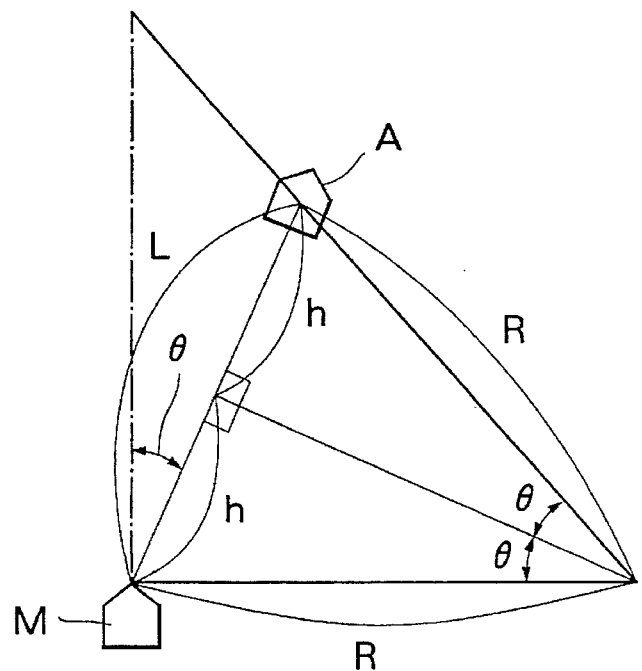
FIG. 22 is a plan view for explaining a case in which both a vehicle with a traveling control system and another vehicle traveling ahead of the vehicle are traveling on the same lane in accordance with the third embodiment of the invention.
Figure 23:
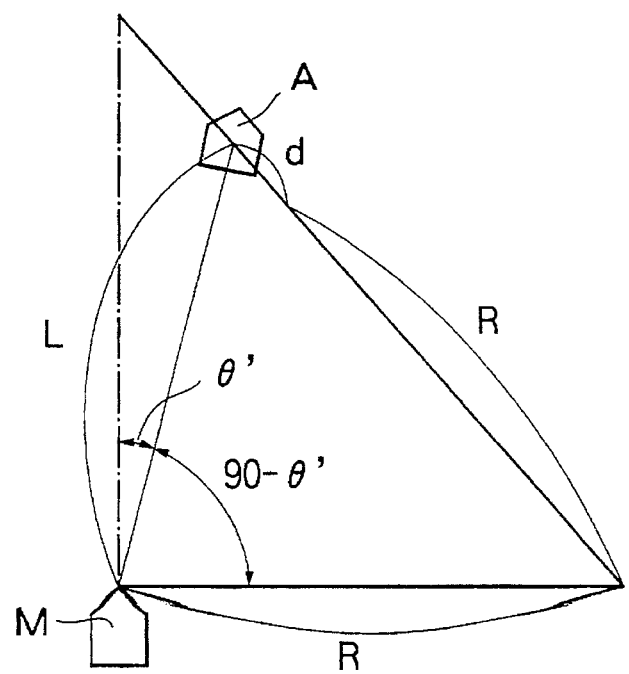
FIG. 23 is a plan view for explaining a case in which the other vehicle traveling ahead is traveling on an adjacent lane to the lane on which the vehicle with the traveling control system is traveling in accordance with the third embodiment of the invention.

FIG. 20 is a flow chart showing a main control routine of the third embodiment. FIG. 21 is a flow chart showing a subroutine of step P4 in FIG. 20. FIG. 22 is a plan view for explaining a case where both of the vehicle M and the vehicle A traveling ahead of the vehicle M are traveling on the same lane. FIG. 23 is a plan view for explaining a case where the vehicle A traveling ahead is traveling on an adjacent lane to the lane on which the vehicle M is traveling.

Referring to FIG. 20, it is determined whether or not a stationary object exists in front of the vehicle M in step P1. If the stationary object exists, a first course K1 is estimated based on stationary object's property in step P2. Since this estimation of the first course K1 in P2 is the same as the estimation explained above in the second embodiment, this estimation is not explained here again.

On the other hand, when the stationary object does not exist, the procedure proceeds to step P3 in which it is determined whether or not a moving object or a traveling vehicle exists ahead of the vehicle M. When the moving object exists, the first course K1 is estimated based on driving conditions of the vehicle traveling ahead of the vehicle M in step P4.

A subroutine of step P4 will be explained with reference to FIG. 21. In the third embodiment of the present invention, the first course K1 is estimated based on two cases in which the vehicle A traveling ahead is traveling on the same lane as the vehicle M and the vehicle A is traveling on an adjacent lane to the lane of the vehicle M.

Referring to FIG. 21, dθ/dL is calculated in step P11, where L is a distance between the vehicle A and the vehicle M, and θ is an angle made by a line connecting the vehicle A and the vehicle M and a line along which the vehicle M is traveling, as shown in FIGS. 22 and 23. Next, in step P12, it is determined whether or not a current value of dθ/dL is equal to one-cycle and two-cycle before values of dθ/dL. Since the vehicle A is considered to travel on the same lane as the vehicle M when the answer is YES in step P12, the procedure proceeds to step P13 in which a radius R of the first course K1 is estimated as R=1/(2dθ/dL). Thereafter, the first course K1 is estimated in step P14. R=1/(2dθ/dL) is obtained as follows (see FIG. 22):

$$L = 2h$$
$$h = R \cdot \sin\theta$$
$$L = 2R \cdot \sin\theta$$
$$R = 1/(2\sin\theta/L) = 1/(2d\theta/dL)$$

where sinθ=θ.

Next, since the vehicle A is considered to travel on an adjacent lane to the lane of the vehicle M when the answer is NO in step P12, the procedure proceeds to step P15 in which it is determined whether or not a change amount in the distance L between the vehicle A and the vehicle M is positive. If the change amount in L is positive, it is determined whether or not dθ/dL becomes small in step P16. If dθ/dL becomes small in step P16, it is considered that the vehicle A ahead is traveling on an outside adjacent lane to the lane of the vehicle M and therefore the procedure proceeds to step P17 in which a radius R of the first course K1 is estimated as R=½(dθ/dL−d/L²). Then the first course K1 is estimated in step 14. If dθ/dL does not become small in step P16, it is considered that the vehicle A ahead is traveling on an inside adjacent lane to the lane of the vehicle M and therefore the procedure proceeds to step P18 in which a radius R of the first course K1 is estimated as R=½(dθ/dL+d/L²). Then the first course K1 is estimated in step 14.

On the other hand, if the change amount in L is not positive in step 15, it is determined whether or not dθ/dL becomes small in step P19. If dθ/dL becomes small in step P19, it is considered that the vehicle A ahead is traveling on an inside adjacent lane to the lane of the vehicle M and therefore the procedure proceeds to step P18 in which a radius R of the first course K1 is estimated as R=½(dθ/dL+d/L²). Then the first course K1 is estimated in step 14. If dθ/dL does not become small in step P19, it is considered that the vehicle A ahead is traveling on an outside adjacent lane to the lane of the vehicle M and therefore the procedure proceeds to step P17 in which a radius R of the first course K1 is estimated as R=½(dθ/dL−d/L²). Then the first course K1 is estimated in step 14.

Referring to FIG. 23, when the vehicle A is traveling on the outside adjacent lane to the lane of the vehicle M, above mentioned R=½(dθ/dL−d/L²) is obtained as follows:

$$R^2 + L^2 - 2RL \cdot \cos(90° - \theta') = (R + d)^2$$
$$L^2 - d(2R + d) = 2RL \cdot \sin\theta' = 2RL \cdot \theta$$
$$d\theta/dL = \tfrac{1}{2}R + d/L^2 \cdot (2R + d)/2R = \tfrac{1}{2}R + d/L^2$$
$$R = \tfrac{1}{2}(d\theta/dL - d/L^2)$$

where sinθ'=θ, (2R+d)/2R=1, and d is a width (about 3.5 meter) of one lane.

When the vehicle A is traveling on the inside adjacent lane to the lane of the vehicle M, above mentioned R=½(dθ/dL+d/L²) is obtained similarly.

According to the third embodiment of the invention, the first course K1 is estimated based on the stationary object's property when the stationary object such as a roadside reflector exists in front of the vehicle M, and the first course K1 is estimated based on the driving conditions of the vehicle A traveling ahead of the vehicle M when the stationary object does not exist in front of the vehicle M. As a result, the first course K1 can be detected constantly with accuracy.

According to the third embodiment of the invention, since the first course K1 is estimated based on two cases in which the vehicle A is traveling on the same lane as the vehicle M and the vehicle A is traveling on an adjacent lane to the lane of the vehicle M, the first course can be estimated with accuracy.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An obstacle detection system for a motor vehicle comprising:

detecting means for detecting objects as obstacles which exist in front of the motor vehicle;

first course estimation means for estimating a first course on which the motor vehicle will travel;

identification means for identifying a first target vehicle among the objects on the first course detected by the detecting means; and second course estimation means for estimating, based on traveling orientations of the first target vehicle, a second course on which the motor vehicle will travel at least while the first target vehicle is outside of the first course;

said identification means identifying a second target vehicle as the obstacle, said second target vehicle being a vehicle currently preceding the motor vehicle among vehicles which travel on one of the first and second courses while the first target vehicle is outside of the first course.

2. An obstacle detection system according to claim 1, wherein said first course estimation means estimates the first course based on driving conditions of the motor vehicle.

3. An obstacle detection system according to claim 1, wherein said identification means identifies the first target vehicle as a target vehicle to be followed by the motor vehicle.

4. An obstacle detection system according to claim 3, wherein said identification means identifies the second target vehicle as the target vehicle to be followed by the motor vehicle.

5. An obstacle detection system according to claim 1, wherein said second course estimation means estimates the second course to be a region having a predetermined width and defined along a line extending between the motor vehicle and the second target vehicle.

6. An obstacle detection system according to claim 1, wherein said identification means identifies the second target vehicle among the vehicles on the first course where a radius of curvature of the second course is less than a predetermined value.

7. An obstacle detection system according to claim 1, wherein the identification means identifies the second target vehicle among the vehicles on the first course after the first target vehicle has left the first course and stopped.

8. An obstacle detection system according to claim 1, wherein the identification means identifies the second target vehicle among the vehicles on the first and second courses based on distances, relative speeds or combinations of a distance and a relative speed between the motor vehicle and the respective vehicles on the first and second courses.

9. An obstacle detection system according to claim 1, and further comprising means for determining that at least one of the objects existing in front of the motor vehicle is a stationary object, said first course estimation means estimating the first course based on a property of the stationary object.

10. An obstacle detection system according to claim 9, wherein said property of the stationary object includes a distance between the motor vehicle and the stationary object, a direction of the stationary object from the motor vehicle, and a relative speed and a lateral moving speed between the motor vehicle and the stationary object.

11. An obstacle detection system according to claim 9, wherein said first course estimation means estimates the first course based on properties of a plurality of stationary objects.

12. An obstacle detection system according to claim 9, wherein said first course estimation course estimates the first course based on the property of the stationary object when the stationary object exists in front of the motor vehicle and estimates the first course based on driving conditions of the motor vehicle when the stationary object does not exist in front of the motor vehicle.

13. An obstacle detection system according to claim 12, and further comprising means for calculating a slip angle of the motor vehicle, said first course estimation means estimating the first course based on traveling conditions including the slip angle of the motor vehicle when the stationary object does not exist in front of the motor vehicle.

14. An obstacle detection system according claim 1, wherein said first course estimation means estimates the first course based on driving conditions of a vehicle traveling ahead of the motor vehicle.

15. An obstacle detection system according to claim 14, and further comprising means for determining that at least one of the objects existing in front of the motor vehicle is a stationary object, said first course estimation means estimating the first course based on a property of the stationary object when the stationary object exists in front of the motor vehicle and estimating the first course based on driving conditions of the vehicle traveling ahead when the stationary object does not exist in front of the motor vehicle.

16. An obstacle detection system according to claim 14, wherein said first course estimation means estimates the first course when the vehicle ahead is traveling on the same lane as the motor vehicle and when the vehicle ahead is traveling on a lane adjacent to the lane on which the motor vehicle is traveling.

17. An obstacle detection system for a motor vehicle comprising:

detecting means for detecting objects as obstacles which exist in front of the motor vehicle;

first course estimation means for estimating a first course on which the motor vehicle will travel;

identification means for identifying a first target vehicle among the objects on the first course detected by the detecting means; and second course estimation means for estimating, based on traveling orientations of the first target vehicle, a second course on which the motor vehicle will travel at least while the first target vehicle is outside of the first course;

said identification means identifying a second target vehicle as the obstacle, said second target vehicle being a vehicle currently preceding the motor vehicle among vehicles which travel on one of the first and second courses while the first target vehicle is outside of the first course;

wherein said identification means identifies the second target vehicle among the vehicles on the second course from a time when the first target vehicle leaves the first course to a predetermined time and identifies the second target vehicle among the vehicles on the first course when the first target vehicle does not return back to the first course and the predetermined time has passed, and said second course estimation means estimates the second course based on the second target vehicle identified.

18. An obstacle detection system according to claim 17, wherein said first course estimation means estimates the first course based on driving conditions of the motor vehicle.

19. An obstacle detection system according to claim 17, wherein the identification means identifies the second target vehicle among the vehicles on the first and second courses based on distances, relative speeds or combinations of a distance and a relative speed between the motor vehicle and the respective vehicles on the first and second courses.

20. An obstacle detection system according to claim 17, wherein said first course estimation means estimates the first course based on driving conditions of a vehicle traveling ahead of the motor vehicle.

* * * * *